(12) United States Patent
Winarski

(10) Patent No.: US 11,621,825 B2
(45) Date of Patent: Apr. 4, 2023

(54) BLOCKCHAIN DIGEST AUGMENTATION OF GROUP-OF-PICTURES VIDEO STREAMS

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 116 days.

(21) Appl. No.: 16/537,054

(22) Filed: Aug. 9, 2019

(65) Prior Publication Data
US 2020/0084022 A1   Mar. 12, 2020

Related U.S. Application Data

(60) Provisional application No. 62/728,837, filed on Sep. 9, 2018.

(51) Int. Cl.
| | |
|---|---|
| *H04L 9/06* | (2006.01) |
| *H04L 9/08* | (2006.01) |
| *G06F 21/60* | (2013.01) |
| *G06F 21/64* | (2013.01) |
| *H04L 9/32* | (2006.01) |
| *H04L 9/00* | (2022.01) |

(52) U.S. Cl.
CPC .......... *H04L 9/0637* (2013.01); *G06F 21/602* (2013.01); *G06F 21/64* (2013.01); *H04L 9/0618* (2013.01); *H04L 9/0643* (2013.01); *H04L 9/0894* (2013.01); *H04L 9/3239* (2013.01); *H04L 9/50* (2022.05)

(58) Field of Classification Search
CPC .... H04L 9/0637; H04L 9/0643; H04L 9/0894
USPC ......................................................... 713/165
See application file for complete search history.

(56) References Cited

U.S. PATENT DOCUMENTS

| | | | | |
|---|---|---|---|---|
| 2010/0312810 A1* | 12/2010 | Horton | ..................... | G06F 21/10 707/812 |
| 2014/0133683 A1* | 5/2014 | Robinson | ................ | H04S 7/305 381/303 |
| 2017/0331635 A1 | 11/2017 | Barinov et al. | | |
| 2017/0345019 A1* | 11/2017 | Radocchia | ............ | H04W 12/10 |
| 2018/0068091 A1* | 3/2018 | Gaidar | ..................... | G06F 21/16 |

(Continued)

FOREIGN PATENT DOCUMENTS

JP        2019032739 A        2/2019

OTHER PUBLICATIONS

Billström et al., "Video Integrity through Blockchain Technology", 2017 (Year: 2017).*

(Continued)

*Primary Examiner* — Kambiz Zand
*Assistant Examiner* — Phuc Pham
(74) *Attorney, Agent, or Firm* — The Winarski Firm, PLLC

(57) ABSTRACT

The present specification is directed toward the use of hash digests and blockchain technology to secure the integrity of a media file having Group-Of-Picture (GOP) video streams, audio streams, and data streams. For GOP video streams, the use of hash digests and blockchain technology may take the form of an H-Frame that appends a GOP of I, P, and B frames. For audio streams, the use of hash digests and blockchain technology may take the form of an AH-Frame that appends an audio block of information. For data streams, the use of hash digests and blockchain technology may take the form of a DH-Frame that appends a data block of information.

20 Claims, 30 Drawing Sheets

(56) References Cited

U.S. PATENT DOCUMENTS

2018/0121635 A1    5/2018    Tormasov et al.
2018/0165364 A1*    6/2018    Mehta .................. G06F 9/54
2019/0229890 A1*    7/2019    Brehmer ............ H04L 9/088
2020/0372184 A1*    11/2020    Meirosu ............ H04L 63/123

OTHER PUBLICATIONS

Adam Hemlin Billström and Fabian Huss, Video Integrity Through Blockchain Technology, Degree Project in Electrical Engineering, Second Level Stockholm, Sweden 2017. https://people.kth.se/~maguire/DEGREE-PROJECT-REPORTS/170802-Adam_Hemlin_Billström_and_Fabian_Huss-with-cover.pdf.

\* cited by examiner

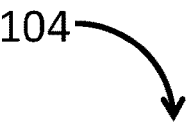

| H-Frame Bytes 106 | H-Frame Description 108 |
|---|---|
| Byte 0: 0h – FFh<br>00h<br>01h<br>02h<br>03h<br>04h<br>05h<br>06h<br>...<br>FEh<br><br>FFh<br><br>110 | HASH IDENTIFIERS<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier<br>...<br>Identifier that there is a link to cloud-based Encryption Key and a link to cloud-based Hash Digest of GOP<br>Identifier that there is a link for both hash algorithm used and resulting cloud-based digest.<br>112 |
| Bytes 1-28<br>Bytes 1-32<br>Bytes 1-48<br>Bytes 1-64<br>Bytes 1-16<br><br>Bytes 1...<br><br>Bytes 1...<br><br>114 | Hash Digest of GOP (when Byte-0 < FEh) as follows:<br>SHA-224 digest (224 bits or 28 bytes)<br>SHA-256 digest (256 bits or 32 bytes)<br>SHA-384 digest (384 bits or 48 bytes)<br>SHA-512 digest (512 bits or 64 bytes)<br>MD5 digest     (128 bits or 16 bytes)<br><br>Link to cloud-based Encryption Key and Link to cloud-based Hash Digest of GOP (when Byte-0 = FEh)<br><br>Link to hash algorithm used and cloud-based Hash Digest of GOP (when Byte-0 = FFh)<br>116 |

FIG. 4

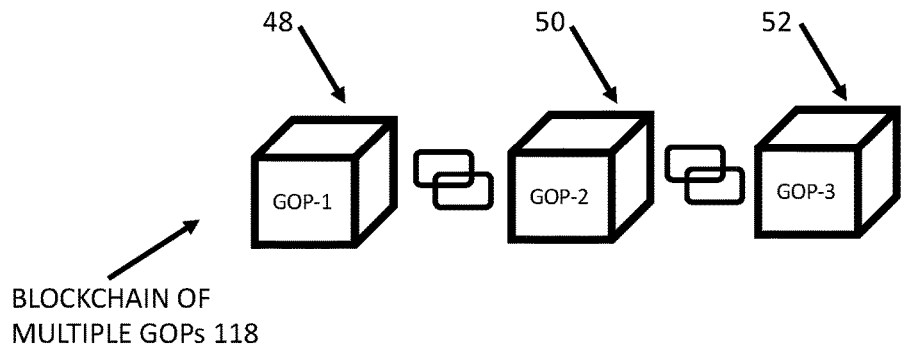

BLOCKCHAIN OF
MULTIPLE GOPs 118

| GOP-1 BLOCK 48 | INFORMATION IN BLOCK:<br>*HASH DIGEST OF CURRENT BLOCK (GOP1) AND A HASH DIGEST OF A PRIOR BLOCK (NOT SHOWN)<br>*DATA: GOP1 |
|---|---|

| GOP-2 BLOCK 50 | INFORMATION IN BLOCK:<br>*HASH DIGEST OF PREVIOUS BLOCK (GOP1) AND HASH DIGEST OF CURRENT BLOCK (GOP2)<br>*DATA: GOP2 |
|---|---|

| GOP-3 BLOCK 52 | INFORMATION IN BLOCK:<br>*HASH DIGEST OF PREVIOUS BLOCK (GOP2) AND HASH DIGEST OF CURRENT BLOCK (GOP3)<br>*DATA: GOP3 |
|---|---|

FIG. 5

154

| H-Frame Bytes 156 | H-Frame Description 162 |
|---|---|
| Byte 0: 0h – FFh<br>00h<br>01h<br>02h<br>03h<br>04h<br>05h<br>06h<br>...<br>FEh<br><br>FFh<br><br>158 | HASH IDENTIFIERS<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier<br>...<br>Identifier that there is a Link to cloud-based Encryption Key and a link to cloud-based Hash Digest of GOIF<br>Identifier that there is a link for both hash algorithm used and resulting cloud-based digest.<br>164 |
| Bytes 1-28<br>Bytes 1-32<br>Bytes 1-48<br>Bytes 1-64<br>Bytes 1-16<br><br>Bytes 1...<br><br>Bytes 1...<br><br>160 | Hash Digest of Group Of I-Frames (when Byte-0 < FEh) as follows:<br>SHA-224 digest (224 bits or 28 bytes)<br>SHA-256 digest (256 bits or 32 bytes)<br>SHA-384 digest (384 bits or 48 bytes)<br>SHA-512 digest (512 bits or 64 bytes)<br>MD5 digest    (128 bits or 16 bytes)<br><br>Link to cloud-based Encryption Key and Link to cloud-based Hash Digest of GOIF (when Byte-0 = FEh)<br><br>Link to hash algorithm used and cloud-based Hash Digest of GOIF (when Byte-0 = FFh)<br>166 |

FIG. 8

| Byte 198 | Function 214 | Description 216 |
|---|---|---|
| 7 212 | Random Access | This flag is set to "1" if you can randomly access this frame and start decoding; otherwise, it is set to "0." Bit 7 is the MSB (most significant bit) and is the left-most bit in Byte 198. |
| 6 210 | Sequence Header | This flag is set to "1" if the IndexEntry points to a frame including a sequence header; otherwise, it is set to "0." |
| 5 208 | Forward Prediction Flag | These two flags can be set in "precise mode," or in naïve mode. Precise mode can be useful to optimize decoder fetches when not all the bidirectional prediction options are used; e.g., in an MPEG-2 closed GOP environment. |
| 4 206 | Backward Prediction Flag | Naïve setting for Bits 5,4<br>I-Frame 00 (no prediction)<br>P-Frame 10 (forward prediction from previous frame)<br>B-Frame 11 (forward & backward prediction)<br>H-Frame 01 (blockchain digest or links thereto)<br><br>In precise mode, the frames are inspected for their prediction dependencies and set as follows:<br>00 = = I-Frame (no prediction)<br>10 = = P-Frame (forward prediction from previous frame)<br>01 = = B-Frame (backward prediction from future frame)<br>11 = = B-Frame (forward and backward prediction) |
| 3 204 | Numerical Range Overload | Defined in SMPTE 381M. This flag was defined to cover the case where there is a large number of B or P frames between anchor frames, or when the temporal offset is very large. This flag is set to a "1" when either TemporalOffset or KeyFrameOffset is outside -128 > value > 127. |
| 2 202 | H-Frame | If the frame is an H-Frame (blockchain digest), set this flag to "1"; otherwise, it is set to "0." |
| 1, 0 200 | MPEG Picture Type | I-Frame 00 (no prediction)<br>P-Frame 10 (forward prediction from previous frame)<br>B-Frame 11 (forward & backward prediction)<br>H-Frame 01 (blockchain digest or links thereto) |

FIG. 10

| Body Partition 178 | Index Seg #1 180 | Body Partition 182 | Key + Length 184 | H Frame 66 | Key + Length 186 | I Frame 68 | Key + Length 188 | B Frame 70 | Key + Length 190 | B Frame 72 | Key + Length 192 | P Frame 74 | Key + Length 194 | B Frame 76 |

176

10010101 byte 198H flag for H-Frame with random access allowed (Bit 7=1)

00000000 byte 198I flag for I-Frame without random access (Bit 7=0)

00110011 byte 198B flag for B-Frames without random access (Bit 7=0)

00100010 byte 198P flag for P-Frame without random access (Bit 7=0)

FIG. 11

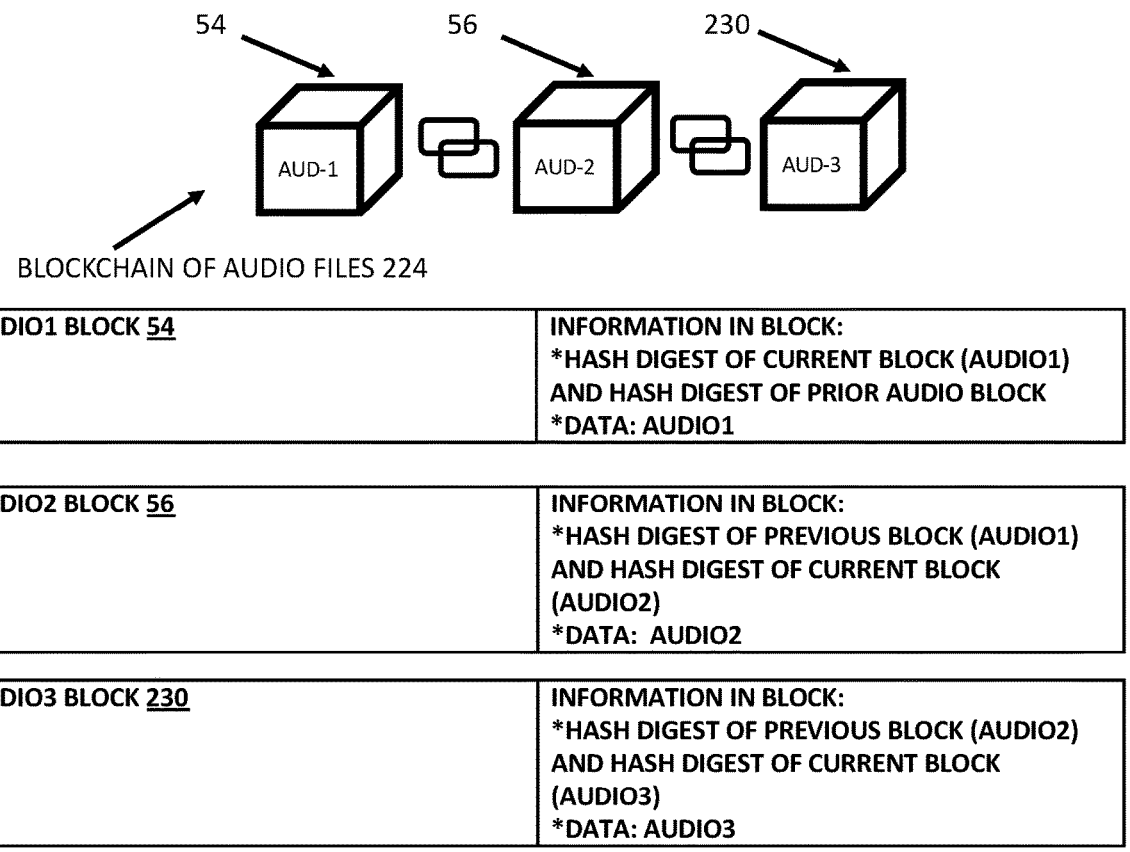

| AUDIO1 BLOCK 54 | INFORMATION IN BLOCK:<br>*HASH DIGEST OF CURRENT BLOCK (AUDIO1) AND HASH DIGEST OF PRIOR AUDIO BLOCK<br>*DATA: AUDIO1 |
|---|---|

| AUDIO2 BLOCK 56 | INFORMATION IN BLOCK:<br>*HASH DIGEST OF PREVIOUS BLOCK (AUDIO1) AND HASH DIGEST OF CURRENT BLOCK (AUDIO2)<br>*DATA: AUDIO2 |
|---|---|

| AUDIO3 BLOCK 230 | INFORMATION IN BLOCK:<br>*HASH DIGEST OF PREVIOUS BLOCK (AUDIO2) AND HASH DIGEST OF CURRENT BLOCK (AUDIO3)<br>*DATA: AUDIO3 |
|---|---|

FIG. 13

| AH-Frame Bytes 234 | AH-Frame Description 240 |
|---|---|
| Byte 0: 0h – FFh<br>00h<br>01h<br>02h<br>03h<br>04h<br>05h<br>06h<br>...<br>FEh<br><br>FFh<br><br>236 | HASH IDENTIFIERS<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier<br>...<br>Identifier that there is a Link to cloud-based Encryption Key and a link to cloud-based Hash Digest of AUDIO FILES<br>Identifier that there is a link for both hash algorithm used and resulting cloud-based digest.<br>242 |
| Bytes 1-28<br>Bytes 1-32<br>Bytes 1-48<br>Bytes 1-64<br>Bytes 1-16<br><br>Bytes 1...<br><br>Bytes 1...<br><br>238 | Hash Digest of Audio File (when Byte-0 < FEh) as follows:<br>SHA-224 digest (224 bits or 28 bytes)<br>SHA-256 digest (256 bits or 32 bytes)<br>SHA-384 digest (384 bits or 48 bytes)<br>SHA-512 digest (512 bits or 64 bytes)<br>MD5 digest     (128 bits or 16 bytes)<br><br>Link to cloud-based Encryption Key and Link to cloud-based Hash Digest of AUDIO FILES (when Byte-0 = FEh)<br><br>Link to hash algorithm used and cloud-based Hash Digest of AUDIO FILES (when Byte-0 = FFh)<br>244 |

FIG. 14

| Byte 264 | Function 276 | Description 278 |
|---|---|---|
| 7 274 | Random Access | This flag is set to "1" if you can randomly access this audio clip and start decoding; otherwise, it is set to "0." Bit 7 is the MSB (most significant bit) and is the left-most bit in Byte 264. |
| 6 272 | Sequence Header | This flag is set to "1" if the IndexEntry points to an audio clip including a sequence header; otherwise, it is set to "0." |
| 5, 4 271 | Naïve setting for bits 5, 4 | MP3 00<br>AAC 10<br>WMA 11<br>AH-Frame 01 (blockchain digest or links thereto) |
| 3 270 | Numerical Range Overload | Defined in SMPTE 381M. This flag was defined to cover the case where there is a large number of audio clips between audio anchors, or when the temporal offset is very large. This flag is set to a "1" when either TemporalOffset or KeyFrameOffset is outside -128 > value > 127. |
| 2 268 | AH-Frame | If the frame is an AH-Frame (blockchain digest), set this flag to "1"; otherwise, it is set to "0." |
| 1, 0 266 | Audio Clip Type | MP3 00<br>AAC 10<br>WMA 11<br>AH-Frame 01 (blockchain digest or links thereto) |

FIG. 15

294 

| DH-Frame Bytes 296 | DH-Frame Description 300 |
|---|---|
| Byte 0: 0h – FFh<br>00h<br>01h<br>02h<br>03h<br>04h<br>05h<br>06h<br>...<br>FEh<br><br>FFh<br><br>299 | HASH IDENTIFIERS<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier<br>...<br>Identifier that there is a Link to cloud-based Encryption Key and a link to cloud-based Hash Digest of GOP<br>Identifier that there is a link for both hash algorithm used and resulting cloud-based digest.<br>302 |
| Bytes 1-28<br>Bytes 1-32<br>Bytes 1-48<br>Bytes 1-64<br>Bytes 1-16<br><br>Bytes 1...<br><br>Bytes 1...<br><br>298 | Hash Digest of Data File (when Byte-0 < FEh) as follows:<br>SHA-224 digest (224 bits or 28 bytes)<br>SHA-256 digest (256 bits or 32 bytes)<br>SHA-384 digest (384 bits or 48 bytes)<br>SHA-512 digest (512 bits or 64 bytes)<br>MD5 digest      (128 bits or 16 bytes)<br><br>Link to cloud-based Encryption Key and Link to cloud-based Hash Digest of GOP (when Byte-0 = FEh)<br><br>Link to hash algorithm used and cloud-based Hash Digest of GOP (when Byte-0 = FFh)<br>304 |

FIG. 19

| Byte 324 | Function 336 | Description 338 |
|---|---|---|
| 7 334 | Random Access | This flag is set to "1" if you can randomly access this data file and start decoding; otherwise, it is set to "0." Bit 7 is the MSB (most significant bit) and is the left-most bit in Byte 264. |
| 6 332 | Sequence Header | This flag is set to "1" if the IndexEntry points to a data file including a sequence header; otherwise, it is set to "0." |
| 5, 4 331 | Naïve setting for bits 5, 4 | .PDF 00<br>.EXE 10<br>.SYS 11<br>DH-Frame 01 (blockchain digest or links thereto) |
| 3 330 | Numerical Range Overload | Defined in SMPTE 381M. This flag was defined to cover the case where there is a large number of data files between data anchors, or when the temporal offset is very large. This flag is set to a "1" when either TemporalOffset or KeyFrameOffset is outside -128 > value > 127. |
| 2 328 | DH-Frame | If the frame is a DH-Frame (blockchain digest), set this flag to "1"; otherwise, it is set to "0." |
| 1, 0 326 | Data File Type | .PDF 00<br>.EXE 10<br>.SYS 11<br>DH-Frame 01 (blockchain digest or links thereto) |

FIG. 20

| Body Partition 308 | Index Seg #1 310 | Body Partition 312 | Key + Length 314 | DH Frame 36 | Key + Length 316 | DATA1 38 | Key + Length 318 | DH Frame 40 | Key + Length 320 | DATA2 42 |

306  →

00010101 byte 324 flag for DH Block without random access (Bit 7=0)

10010101 byte 324 flag for DH Block with random access allowed (Bit 7=1)

00000000 byte 324 flag for DATA1 (.PDF)

00100010 byte 324 flag for DATA2 (.EXE)

FIG. 21

BLOCKCHAIN DIGEST AUGMENTATION OF GROUP-OF-PICTURES VIDEO STREAMS

This application claims priority to provisional patent application 62/728,837 filed on Sep. 9, 2018.

FIELD OF THE INVENTION

The underlying idea behind this specification is to combine blockchain technology with an implementation of the Material eXchange Format (MXF) standard. There are numerous specific tangible methods in which blockchain technology can be incorporated into the Material eXchange Format (MXF) standard. One such specific tangible implementation of this idea is to incorporate blockchain technology into the metadata generated in combination with the Material eXchange Format (MXF) standard and store that metadata within the system item of the MXF file, as disclosed in the patent application entitled "MATERIAL EXCHANGE FORMAT MXF FILE AUGMENTED WITH BLOCKCHAIN HASHING TECHNOLOGY," Ser. No. 16/055,379, invented by TYSON YORK WINARSKI, filed on Aug. 6, 2018. In contrast, the present specification discloses a specific technological implementation for employing blockchain technology to provide data security of media files within a Material eXchange Format (MXF) File by incorporating the blockchain technology with the essence of the MXF file into the generic containers of the MXF File separate from the system item.

BACKGROUND

Blockchain technology is finding increasing use for ensuring the error-free transfer of information. A hash algorithm takes input and converts it to, at a very high probability, a unique series of digits called a hash digest. The more digits in this hash digest, the less likely that there would be a collision, where different inputs had the same hash digest. The hash function demonstrates the avalanche effect, where a tiny change in the input, no matter how small, creates a significant change to the output digest. This specification melds the MFX format and Blockchain hash technology, to provide a standards-compatible implementation. MXF, the Material eXchange Format, is a container format for professional digital video and audio/sound media which is defined by a set of SMPTE standards. SMPTE, the Society of Motion Picture and Television Engineers, was founded in 1916 as the Society of Motion Picture Engineers.

MXF is a "container" or "wrapper" format which supports a number of different streams of coded "essence", encoded in any of a variety of video and audio/sound compression formats, together with a metadata wrapper which describes the material contained within the MXF file. MXF has full timecode and metadata support, and is intended as a platform-agnostic stable standard for future professional video and audio/sound applications. MXF was developed to carry a subset of the Advanced Authoring Format (AAF) data model, under a policy known as the Zero Divergence Directive (ZDD). This theoretically enables MXF/AAF workflows between Non-Linear Editing (NLE) systems using AAF and cameras, servers, and other devices using MXF. There are 2 basic types of MXF clip: The first are those where the essence (media) is actually stored in the same file as the metadata that refers to it. These files are said to have internal essence. The second type is that where the essence is stored in separate files to the metadata, and these files are said to have external essence. In this case, the decoder first reads the metadata file, and that metadata points to the files in which the individual pieces of essence are stored.

XDCAM MXF from SONY™ is supported by ADOBE™ After Effects, ADOBE™ Premiere Pro, APPLE™ Final Cut Pro X, AUTODESK™ Smoke, AVID™, CAPELLA SYSTEMS™, DALET™, EVS™, IMAGINE COMMUNICATIONS CORPORATION™, OMNEON™, QUANTEL™, RHOZET™, SONY™ Vegas Pro, SORENSON™ Squeeze, TELESTREAM™ FlipFactory, GRASSVALLEY™ EDIUS, GRASSVALLEY™ K2, and MERGING TECHNOLOGIES™ VCube. P2 MXF by PANASONIC™ is supported by ADOBE™ After Effects, ADOBE™ Premiere Pro, APPLE™ Final Cut Pro X, AUTODESK™ Smoke, AVID™, DALET™, EVS™, GRASSVALLEY™ EDIUS, and GRASSVALLEY™ K2. IKEGAMI™ offers camcorders capable of recording in MXF wrapper using AVID™ DN.x.HD video encoding at 145 Mbit/second, as well as MPEG-2 video encoding at 50 Mbit/second 4:2:2 long-GOP and 100 Mbit/second I-frame. GOP stands for Group of Pictures, consisting of I (independently coded), P (predictively coded using one picture), and B (bipredictive coded using two pictures) frames. In 2010, CANON™ released its new lineup of professional file-based camcorders. The recording format used in these camcorders incorporates MPEG-2 video with bitrates up to 50 Mbit/second and 16-bit linear PCM audio/sound in what CANON™ has called XF codec. CANON™ claims that its flavor of MXF is fully supported by major NLE systems including ADOBE™ Premiere, APPLE™ Final Cut Pro X, AVID™ Media Composer, and GRASSVALLEY™ EDIUS. MXF is used as the audio and video packaging format for Digital Cinema Package (DCP). It is also used regarding STANAG (NATO STANdardized AGreement) specification documents. The file extension for MXF files is ".mxf". The MACINTOSH™ file type code registered with APPLE™ for MXF files is "mxf", including a trailing space. The Internet would have "application/mxf". CinemaDNG (intended by ADOBE™ and others to be an open file format for digital cinema files) exploits MXF as one of its options for holding a sequence of raw video images.

SUMMARY

The present specification is directed toward the use of hash digests and blockchain technology to secure the integrity of a media file having Group-Of-Picture (GOP) video streams, audio streams, and data streams. For GOP video streams, the use of hash digests and blockchain technology may take the form of an H-Frame that appends a GOP of I, P, and B frames. For audio streams, the use of hash digests and blockchain technology may take the form of an AH-Frame that appends an audio block of information. For data streams, the use of hash digests and blockchain technology may take the form of a DH-Frame that appends a data block of information. The media file formed of these GOPs, audio blocks, and data blocks, and H-Frames, AH-Frames, and DH-Frames may be wrapped into an MXF file for transmission. In one embodiment, the blockchain hash digests of the GOPs for the H-Frames is based on a hashing of the I, B, and P frames. In another embodiment, the blockchain hash digests of the GOPs for the H-Frames is based on a hashing of the I-Frames extracted from the series of GOPs.

A digital Group Of Pictures (GOP) blockchain stored in electronic memory is disclosed in the present specification. The digital Group of Pictures includes a first Group Of Pictures having I, B, and P frames and a first H-Frame containing first hash digest information formed from the first Group Of Pictures and a hash digest from a prior Group Of Pictures. This data structure forms a first blockchain block having the first Group Of Pictures as data and the first hash digest information as blockchain hash digest information. The digital Group of Pictures also includes a second Group Of Pictures having I, B, and P frames and a second H-Frame containing second hash digest information formed from the second Group Of Pictures and a first hash digest formed from the first Group Of Pictures. This data structure forms a second blockchain block having the second Group Of Pictures as data, and the second hash digest information as blockchain hash digest information. The digital Group of Pictures may also include an initial Group Of Pictures having I, B, and P frames and a genesis H-Frame containing genesis hash digest information formed from the initial Group Of Pictures. This data structure forms a genesis blockchain block having the initial Group Of Pictures as data and the genesis hash digest information as blockchain hash digest information. The first hash digest information may be a first hash digest, or the first hash digest information may be a link to a cloud-based first hash digest. The second hash digest information may be a second hash digest, or the second hash digest information may be a link to a cloud-based second hash digest. The genesis hash digest information may be a genesis hash digest, or the genesis hash digest information may be a link to a cloud-based genesis hash digest. The links to the cloud-based hash digests are accessible without any security credentials for a public access blockchain system. Alternatively, the links to the cloud-based hash digests are accessible only with security credentials for a private access blockchain system. The first hash digest may be formed from just the I-Frames of the first Group Of Pictures and a hash digest formed from just the I-Frames of the prior Group Of Pictures. The second hash digest may be formed from just the I-Frames of the second Group Of Pictures and the first hash digest. The first hash digest may be formed from just the I, B, and P-Frames of the first Group Of Pictures and a hash digest formed from just the I, B, and P-Frames of the prior Group Of Pictures. The second hash digest is formed from just the I, B, and P-Frames of the second Group Of Pictures and the first hash digest. The first Group Of Pictures may be encrypted with a first cloud-based encryption key where a link to the first cloud-based encryption key is stored within the first H-Frame. The second Group Of Pictures may be encrypted with a second cloud-based encryption key where a link to the second cloud-based encryption key is stored within the second H-Frame. The initial Group Of Pictures may be encrypted with an initial cloud-based encryption key where a link to the initial cloud-based encryption key is stored within the genesis H-Frame. The first H-Frame may further include an algorithm identifier specifying the hash algorithm used to form the first hash digest, wherein the second H-Frame further comprises an algorithm identifier specifying the hash algorithm used to form the second hash digest, and wherein the genesis H-Frame further comprises an algorithm identifier specifying the hash algorithm used to form the genesis hash digest. The digital Group of Pictures may also include a Material eXchange Format (MXF) digital file having a system item and a generic container. The system item contains metadata on the genesis Group Of Pictures, first Group Of Pictures, and second Group Of Pictures. The generic container contains the genesis Group Of Pictures, first Group Of Pictures, and second Group Of Pictures, and the genesis H-Frame, first H-Frame, and second H-Frame. The genesis H-Frame, first H-Frame, and second H-Frame may be stored together as an H-Frame set within the generic container. Alternatively, the genesis H-Frame, first H-Frame, and second H-Frame may be stored sequentially prior to their respective Group Of Pictures within the generic container. In addition, the genesis H-Frame, first H-Frame, and second H-Frame may be stored sequentially after their respective Group Of Pictures within the generic container. The Material eXchange Format (MXF) digital file may be transmitted electronically from a sender to a receiver over a communications link such as a satellite transmission link, a terrestrial wireless transmission link, and a distributed network communications link. An MXF File System Manager located on the receiver error checks the Material eXchange Format (MXF) digital file by extracting the genesis Group Of Pictures, first Group Of Pictures, and second groups of pictures from the generic container and creating new hash digests of the genesis group of pictures, first Group Of Pictures, and second groups of pictures. The MXF File System Manager then compares these new hash digests to the blockchain hash digest information stored within the genesis H-Frame, first H-Frame, and second H-Frame transmitted in the received Material eXchange Format (MXF) digital file. The receiver requests the sender to retransmit the Material eXchange Format (MXF) digital file when the new hash digests do not match the blockchain hash digest information stored within the genesis H-Frame, first H-Frame, and second H-Frame transmitted in the received Material eXchange Format (MXF) digital file.

A digital media file blockchain stored in electronic memory is disclosed in the present specification. The digital media file blockchain includes a set of Group Of Picture (GOP) files, ad set of audio files, and a set of data files. The set of Group of Pictures (GOP) files includes a Group Of Pictures and a GOP hash file containing GOP hash digest information formed from the Group Of Pictures and a prior GOP hash digest formed from a prior Group of Pictures. This data structure forms a GOP blockchain block having the Group Of Pictures as data and the GOP hash digest information as GOP blockchain hash digest information. The set of audio files includes an audio file and an audio hash file containing audio hash digest information formed from the audio file and a prior audio hash digest from a prior audio file. This data structure forms an audio blockchain block having the audio file as data and the audio hash digest information as audio blockchain block hash digest information. The set of data files includes a data file and a data hash file containing data hash digest information formed from the data file and a prior data hash digest from a prior data hash file. This data structure forms a data blockchain block having the data file as data and the data hash digest information as data blockchain block hash digest information. The GOP hash digest information may be a GOP hash digest, or the GOP hash digest information may be a link to a cloud-based GOP hash digest. The audio hash digest information may be an audio hash digest, or the audio file hash digest information may be a link to a cloud-based audio hash digest. The data hash digest information may be data hash digest, or the data hash digest information may be a link to a cloud-based data hash digest. The GOP hash file may further include an algorithm identifier specifying the hash algorithm used to form the GOP hash digest and a link to a cloud-based encryption key when the set of Group of Picture files is encrypted. The audio hash file may further include an algorithm identifier specifying the hash algorithm used to form the audio hash digest and a link to a cloud-based encryption key when the audio files are encrypted. The data hash file may further include an algorithm identifier specifying the hash algorithm used to form the data hash digest and a link to a cloud-based encryption key when the data files are encrypted. The digital media file blockchain may also include a Material eXchange Format (MXF) digital file having a system item and a generic container. The system item contains metadata on the set of Group Of Picture files, the set of audio files, and the set of data files. The generic container contains the set of groups of pictures files, the set of audio files, and the set of data files. The Material eXchange Format (MXF) digital file is transmitted electronically from a sender to a receiver over a communications link such as a satellite transmission link, a terrestrial wireless transmission link, and a distributed network communications link. An MXF File System Manager located on the receiver error checks the Material eXchange Format (MXF) digital file by extracting the set of groups of pictures files, the set of audio files, and the set of data files from the generic container and creating a new hash digest of the set of Group Of Picture files, the set of audio files, and the set of data files. The MXF File system manager compares the new hash digests to the GOP blockchain hash digest information, audio blockchain hash digest information, and data blockchain hash digest information received with the Material eXchange Format (MXF) digital file. The receiver requests the sender to retransmit the Material eXchange Format (MXF) digital file when the new hash digests do not match the GOP blockchain hash digest information, audio blockchain hash digest information, and data blockchain hash digest information received with the Material eXchange Format (MXF) digital file.

A method for digital transmission of a Group Of Pictures (GOP) in a Material eXchange Format (MXF) File is disclosed in the present specification. This method will access a stored Group Of Pictures file from a digital data storage device and generate a hash digest from the stored Group Of Pictures file and a prior hash digest of a prior Group Of Pictures file. The method then stores hash digest information based upon the hash digest in an H-Frame file appended to the Group Of Pictures file and generates metadata on the Group Of Pictures file. The method then wraps the Group Of Pictures within a Material eXchange Format (MXF) File by placing the Group Of Pictures file and H-Frame file within a generic container and storing the metadata within a system item. Lastly, the method transmits the Material eXchange Format (MXF) File across a communications link from a sender node to a receiver node with a satellite transmission link, a terrestrial wireless transmission link, or a distributed network communications link. With this method, the Group Of Pictures may be encrypted with a cloud-based encryption key. A link to the cloud-based encryption key may be stored in the H-Frame file. The hash digest information may also link to a cloud-based hash digest. The link to the cloud-based hash digest may be accessible without any security credentials for a public access blockchain system. The link to the cloud-based hash digest may be accessible only with security credentials for a private access blockchain system. An identifier specifying the hash algorithm used to form the cloud-based hash digest may also be stored in the H-Frame file. The method also includes accessing the Material eXchange Format (MXF) File at the receiver node after it has been transmitted from the sender node and parsing the link to the cloud-based hash digest from the Material eXchange Format (MXF) File. The method then accesses the cloud-based hash digest with the link and parses the Group Of Pictures file in the generic container from the Material eXchange Format (MXF) File.

Next, the method forms a new hash digest of the Group Of Pictures file at the receiver node and compares the new hash digest to the cloud-based hash digest. The method will then allow access to the Group Of Pictures file when the new hash digest matches the cloud-based. The method will deny access to the Group Of Pictures file when the new hash digest does not match the cloud-based hash digest and contact the sender node to retransmit the Material eXchange Format (MXF) File to the receiver node when the new hash digest does not match cloud-based hash digest. This method may also access the Material eXchange Format (MXF) File at the receiver node after it has been transmitted from the sender node. In this case the hash digest information in the H-Frame is a hash digest. The method then parses the hash digest from the Material eXchange Format (MXF) File. The method also parses the Group Of Pictures file in the generic container from the Material eXchange Format (MXF) File. The method then forms a new hash digest of the Group Of Pictures file at the receiver node and compares the new hash digest to the hash digest accessed from the Material eXchange Format (MXF) File. The method then allows access to the Group Of Pictures file when the new hash digest matches the hash digest accessed from the Material eXchange Format (MXF) File. However, the method will deny access to the Group Of Pictures file when the new hash digest does not match the hash digest accessed from the Material eXchange Format (MXF) File. The method will also contact the sender node to retransmit the Material eXchange Format (MXF) File to the receiver node when the new hash digest does not match the hash digest accessed from the Material eXchange Format (MXF) File. The method may also access the cloud-based encryption key with the link stored in the H-Frame and decrypt the Group Of Pictures file.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 4 illustrates a table defining the format of the H-Frame for a Group Of Pictures (GOP) to include identifying a hash algorithm and the blockchain digest, which is the output of this hash algorithm;

FIG. 5 illustrates an exemplary blockchain of multiple Group Of Pictures (GOP);

FIG. 8 illustrates a table defining the format of the H-Frame for a GIF to include identifying a hash algorithm and the blockchain digest, which is the output of this hash algorithm;

FIG. 10 illustrates a table of MXF flags, which identify H, I, P, and B frames;

FIG. 11 illustrates a detailed expansion of FIGS. 1-10, where MXF flags are shown for individual H-frames and accompanying I, P, and B frames for a Group-Of-Pictures (GOP);

FIG. 13 illustrates an exemplary blockchain of multiple audio blocks;

FIG. 14 illustrates a table defining the format of the AH-Frame for an audio data file to include identifying a hash algorithm and the blockchain digest, which is the output of this hash algorithm;

FIG. 15 illustrates a table of MXF flags, which identify AH-Frames;

FIG. 19 illustrates a table defining the format of the DH-Frame for a data block to include identifying a hash algorithm and the blockchain digest, which is the output of this hash algorithm;

FIG. 20 illustrates a table of MXF flags, which identify DH-Frames;

FIG. 21 illustrates a detailed expansion of FIG. 1, where MXF flags are shown for individual DH-frames and accompanying data blocks;

DETAILED DESCRIPTION

Figure 1:
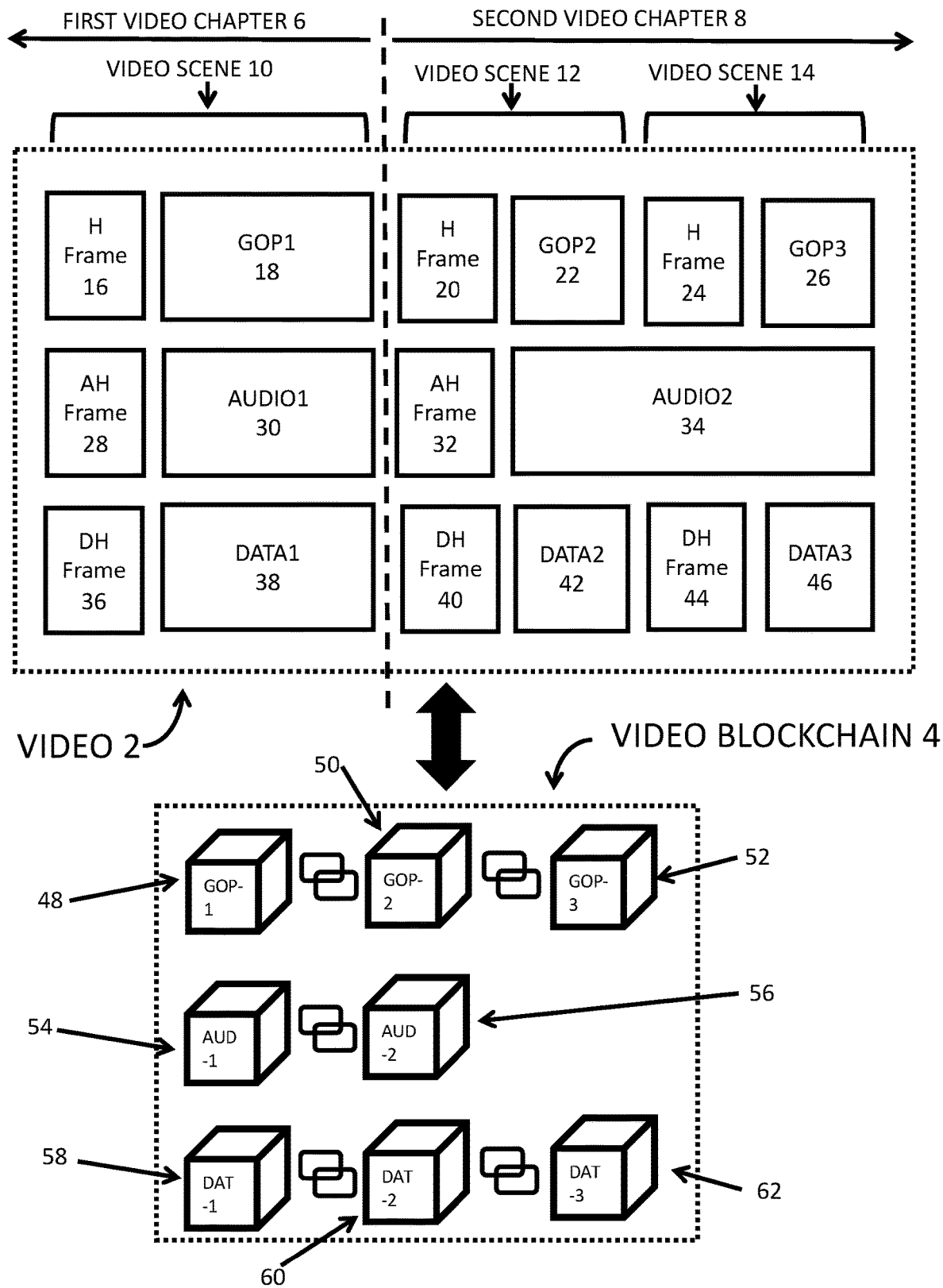
FIG. 1 illustrates a diagram of a media file as a series of data frames and blocks and as a set of blockchains.

While the invention has been shown and described with reference to a particular embodiment thereof, it will be understood to those skilled in the art, that various changes in form and details may be made therein without departing from the spirit and scope of the invention. FIG. 1 illustrates a diagram of a media file as a series of data frames and blocks and as a set of blockchains. The media file in this example is a video file 2. Video file 2 can be structured in the form of a video blockchain 4. Video file 2 is descriptively shown having a first video chapter 6 and a second video chapter 8. Video chapter 6 and video chapter 8 may represent different sections within a movie. First video chapter 6 includes a single video scene 10. Second video chapter 8 includes video scene 12 and video scene 14. Video scene 10 includes a Group Of Pictures (GOP) GOP1 18, audio file AUDIO1 30, and a data file DATA1 38. Group of Pictures GOP1 18 is formed of a series of I-Frames, B-Frames, and P-Frames. GOP1 18 is also paired with an H-Frame 16. The H in H-Frame designates this frame as a hash digest frame. H-Frame 16 contains hash digest information on GOP1 18. Video 2 is organized in the present invention into a video blockchain 4. As such H-Frame 16 includes hash digest information on GOP1 18 as well as hash digest information from a previous Group Of Pictures, thereby forming a chain of interlinking hash digests. This hash digest information may include an actual hash digest. Alternatively, the hash digest information within H-Frame 16 may include a link to a cloud-based hash digest.

AUDIO1 30 is similarly paired with AH-Frame 28. AUDIO1 30 is a digital file that includes audio information, such as the soundtrack, sound effects, human speech, and other sound information that accompanies GOP1 18. AH-Frame 28 is an Audio-Hash frame that contains audio hash information about AUDIO1 file 30 as well as audio hash digest information from a previous AUDIO file. This hash digest information may include an actual hash digest. Alternatively, the hash digest information within AH-Frame 28 may include a link to a cloud-based hash digest. Data file DATA1 38 is paired with DH-Frame 36. DATA1 38 is a digital file that contains data that accompanies the video information in GOP1 18, and audio information AUDIO1 30. DATA1 38 may include digital information such as closed-captioning information about video scene 10, digital information about GOP1 or AUDIO1, or links to other cloud-based information. DH-Frame 36 is a Data-Hash frame that contains hash digest information about DATA1 38 and a previous DATA file, thereby forming a chain of interlinking hash digests. H-Frame 16, AH-Frame 28, and DH-Frame 36 all provide the ability to error check their associated files GOP1 18, AUDIO1 30, and DATA1 38. First video chapter 6 is shown having a single video scene 10 for exemplary purposes only. It is contemplated that first video chapter 6 may have any number of video scenes 10. Similarly, video scene 10 is shown having one GOP1 18, one AUDIO1 30, and one DATA1 38 for exemplary purposes only. It is contemplated that video scene 10 may have any number of Groups Of Pictures, any number of AUDIO blocks, and any number of DATA blocks.

Second video chapter 8 includes two video scenes, 12 and 14, for illustrative purposes. It is contemplated that second video chapter 8 may include any number of video scenes. GOP2 22 and GOP3 26 sequentially follow GOP1 18. GOP2 22 is paired with H-Frame 20. H-Frame 20 includes hash digest information about GOP2 22. This hash digest information may be an actual hash digest or a link to a cloud-based hash digest. Video 2 is organized in the present invention into a video blockchain 4. As such H-Frames 20 and 24 include interlinking hash digest information about their respective GOP and a prior GOP to form a chain of interlinking hash digests. H-Frame 20 includes hash digest information based upon GOP1 18 and GOP2 22. H-Frame 24 includes hash digest information based upon GOP2 22 and GOP3 26. This hash digest information may be an actual hash digest or a cloud-based hash digest. Video scene 12 includes GOP2 22 and H-Frame 20. Video scene 14 includes GOP3 26 and H-Frame 24. Note that AUDIO2 34 spans both video scene 12 and video scene 14. It is common for a musical score to continue across multiple video scenes. AUDIO2 34 is paired with AH-Frame 32. AH-Frame 32 includes audio digest information based on AUDIO2 34 and AUDIO1 30, thereby forming a chain of interlinking hash digest information between AH-Frame 28 and AH-Frame 32. DATA2 42 is paired with DH-Frame 40. DATA3 46 is paired with DH-Frame 44. DH-Frame 40 includes hash digest information based upon DATA1 36 and DATA2 42. DH-Frame 44 includes hash digest information based on DATA3 46 and DATA2 42. Thus, DH-Frame 40 and DH-Frame 44 form a series of interlinking hash digests with DH-Frame 36.

The content of video 2 may be characterized as video blockchain 4. Video blockchain 4 includes a series of Group Of Pictures blocks GOP-1 48, GOP-2 50, and GOP-3 52. The depiction of video blockchain 4 having just three blocks of Groups of Pictures is merely exemplary. It is contemplated that video blockchain 4 may have any number of Groups Of Pictures blocks. GOP-1 block 48 includes GOP1 18 as data and the hash digest information from H-Frame 16 as blockchain hash digest information. GOP-2 block 50 includes GOP2 22 as data and the hash digest information from H-Frame 20 as blockchain hash digest information. GOP-3 block 52 includes GOP3 26 as data and the hash digest information from H-Frame 24 as blockchain hash digest information. Video blockchain 4 may include any number of audio blocks of blockchain information. In this exemplary depiction, video blockchain 4 includes two audio blockchain blocks, AUD-1 54 and AUD-2 56. AUD-1 block 54 includes AUDIO1 30 as data and includes the audio hash digest information from AH-Frame 28 as blockchain hash digest information. AUD-2 block 56 includes AUDIO2 34 as data and includes the audio hash digest information of AH-Frame 32 as blockchain hash digest information. Video blockchain 4 may include a blockchain of any number of DATA blocks of information. FIG. 1 illustrates video blockchain 4 having an exemplary three blocks of DATA formed in a blockchain, DAT-1 58, DAT-2 60, and DAT-3 62. DAT-1 block 58 includes DATA1 38 as data and also includes the hash digest information from DH-Frame 36 as blockchain hash digest information. DAT-2 block 60 includes DATA2 42 as data and also includes the hash digest information from DH-Frame 40 as blockchain hash digest information. DAT-3 block 62 includes DATA3 38 as data and also includes the hash digest information from DH-Frame 36 as blockchain hash digest information.

Figure 2:
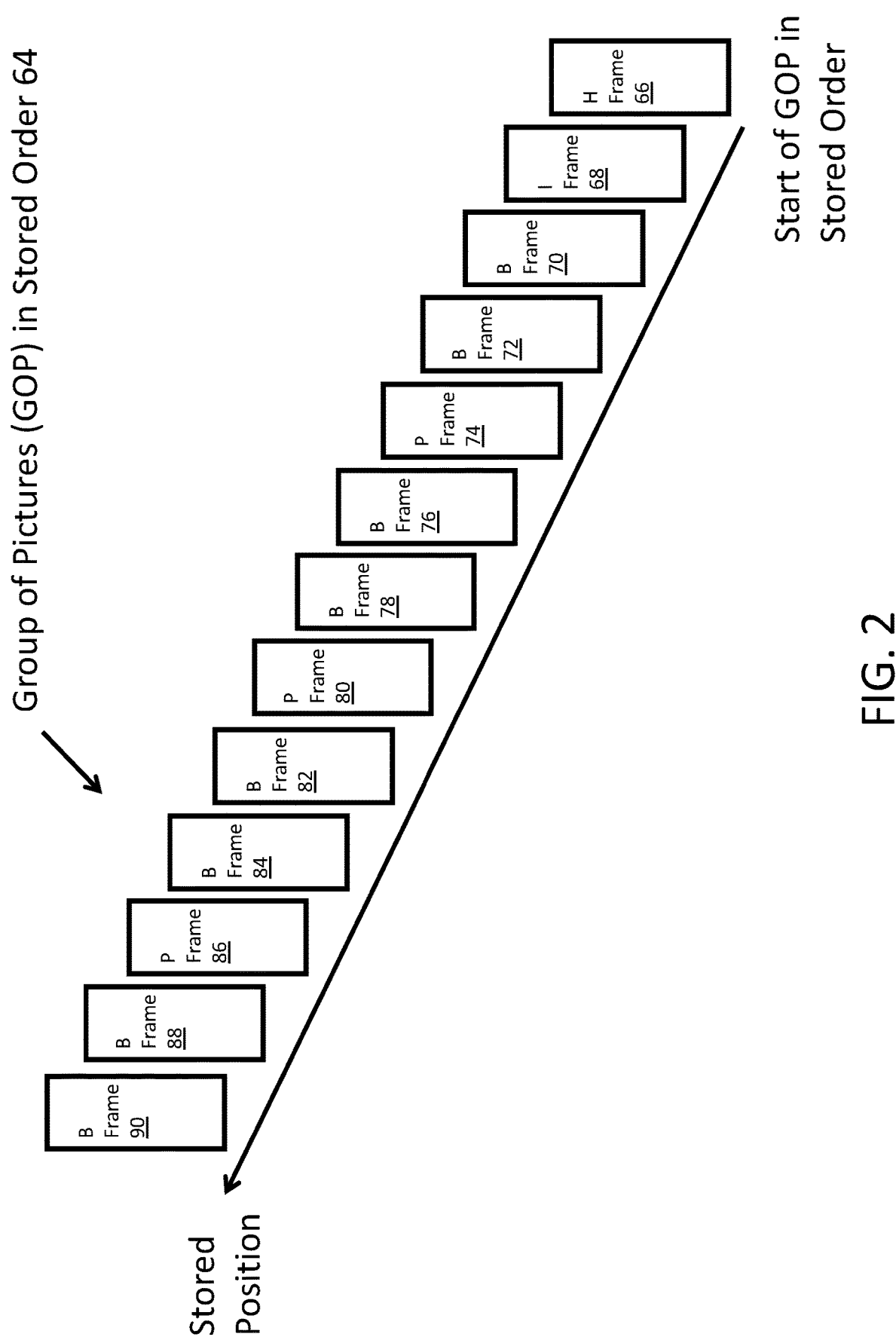
FIG. 2 illustrates a diagram of a video stream formed of a Group Of Pictures (GOP) I, B, and P Frames, where each GOP is preceded by an H-Frame.

FIG. 2 illustrates a diagram of a video stream formed of a Group Of Pictures (GOP) I, B, and P Frames shown in stored order 64, where each GOP is preceded by an H-Frame, such as H-Frame 66. GOP 64 includes I-Frame 68, B-Frames 70, 72, 76, 78, 82, 84, 88 and 90. GOP 64 also includes P-Frames 74, 80 and 86. I-Frame 68 (intra coded frame) is a frame that is coded independently of all other frames. Each GOP 64 begins (in stored order) with this type of frame. P-Frames 74, 80 and 86 (predictive coded frame) contains motion-compensated difference information relative to previously decoded frames. GOP 64 is representative of the structure of the Groups of Pictures illustrated in FIG. 1, including GOP1 18, GOP2 22, and GOP3 26. In older designs such as MPEG-1, H.262/MPEG-2, and H.263, each P-Frame can only reference one frame, and that frame must precede the P-Frame in display order as well as in decoding order and must be an I-Frame or a P-Frame. These constraints do not apply in the newer standards H.264/MPEG-4 AVC and HEVC. B-Frames 70, 72, 76, 78, 82, 84, 88 and 90 (bi-predictive coded frame) contains motion-compensated difference information relative to previously decoded frames. In older designs such as MPEG-1 and H.262/MPEG-2, each B-Frame can only reference two frames, the one which precedes the B-Frame in display order and the one which follows, and all referenced frames must be I-Frames or P-Frames. These constraints do not apply in newer standards H.264/MPEG-4 AVC and HEVC. HEVC stands for High Efficiency Video Coding, which is also known as H.265 and MPEG-H Part 2. HVEC is a video compression standard, one of several potential successors to the widely used AVC (H.264 or MPEG-4 Part 10). In comparison to AVC, HEVC offers about double the data compression ratio at the same level of video quality, or substantially improved video quality at the same bit rate. It supports resolutions up to 8192.times.4320, including 8K UHD (Ultra High Definition). AVC stands for Advanced Video Coding. It is a block-oriented motion-compensation-based video compression standard. The I-Frame, P-Frame, and B-Frame structure of Group of Pictures 64 is often referred to by two numbers, for example, M=3, N=12. The first number tells the distance between two anchor frames (I or P). The second one tells the distance between two full images (I-frames), thereby designating the size of the GOP. In FIG. 2, for example, M=3, N=12, and the structure of GOP 64 depicted is IBBPBBPBBPBB which has N=12 frames total in the GOP sequence. There is an I or P frame every M=3 frames in the repeating sequence IBB PBBPBBPBB IBBPBBPBBPBB IBBPBBPBBPBB . . . .

In FIG. 2, H-Frame 66 contains the blockchain hash digest information of GOP 64, as well as the identification of the hash algorithm used. The blockchain digest information is typically created via the SHA-2 (Secure Hash Algorithm 2) which is a set of cryptographic hash functions designed by the United States National Security Agency (NSA). These hash digests are built using the Merkle-Damgård structure, from a one-way compression function itself built using the Davies-Meyer structure from a (classified) specialized block cipher. Cryptographic hash functions are mathematical operations run on digital data. By comparing the computed "hash digest" (the output from execution of the algorithm) to a known and expected hash digest value, a person can determine the integrity of the data. For example, computing the hash digest of a downloaded file and comparing that result to a previous hash digest can show whether the download has been modified or tampered with. A key aspect of cryptographic hash functions is their collision resistance. It is improbable to find two different input values that result in the same hash digest output. SHA-2 includes significant changes from its predecessor, SHA-1. The SHA-2 family has six hash functions with digests (hash values) that are 224, 256, 384 or 512 bits: SHA-224, SHA-256, SHA-384, SHA-512, SHA-512/224, SHA-512/ 256. SHA-256 and SHA-512 are hash functions computed with 32-bit and 64-bit words, respectively. They use different shift amounts and additive constants, but their structures are otherwise virtually identical, differing only in the number of rounds. SHA-224 and SHA-384 are simply truncated versions of the first two, computed with different initial values. SHA-512/224 and SHA-512/256 are also truncated versions of SHA-512, but the initial values are generated using the method described in Federal Information Processing Standards (FIPS) PUB 180-4. SHA-2 was published in 2001 by the National Institute of Standards and Technology (NIST) as a U.S. federal standard (FIPS). The SHA-2 family of algorithms are patented in U.S. Pat. No. 6,829,355. The United States has released the patent under a royalty-free license. GOP 64 is an exemplary representation of a series of I-Frames, B-Frames, and P-Frames that form a Group of Pictures, which may be GOP1, 18, GOP2 22, or GOP3 26 from FIG. 1. H-Frame 66 may be H-Frame 16, 20, or 24 from FIG. 1.

Figure 3:
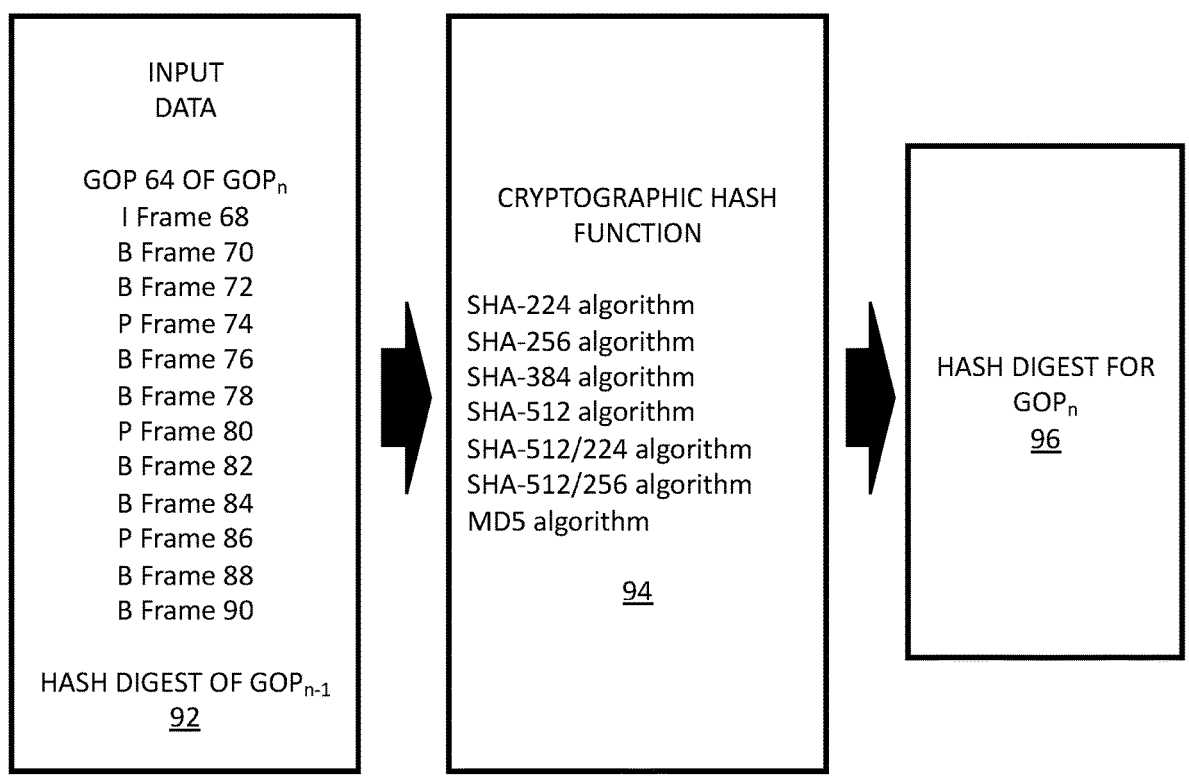
FIG. 3 illustrates a diagram depicting a process for forming a blockchain hash digest of a series of Group Of Pictures (GOP) based on a current GOP and a previous GOP.

FIG. 3 illustrates a diagram depicting a process for forming a blockchain hash digest of a series of Group Of Pictures (GOP) based on a current GOP 64 and a previous GOP. The process of FIG. 3 may be used on any Group Of Pictures, such as the Groups of Pictures illustrated in FIG. 1, including GOP1 18, GOP2 22, and GOP3 26, to convert it into a hash digest for later verification use in combination with the hashed Group Of Pictures. A cryptographic hash function module 386, shown in FIG. 27, follows the process shown in FIG. 3 to generate a blockchain hash digest of a Group Of Pictures. In step 92, cryptographic hash function module 386 takes input data. Blockchain hash digest information in a particular block is formed based on the data in that current block as well as the hash digest information from a previous block. In this case, the input data for calculating the hash digest of a particular blockchain block is based upon the data from $GOP_n$ and the hash digest of $GOP_{n-1}$. Here $GOP_n$ is GOP 64 shown in FIG. 2 that is formed of I-Frame 68, B-Frames 70, 72, 76, 78, 82, 84, 88 and 90, and P-Frames 74, 80 and 86. In step 94, cryptographic hash function module 386 takes the input data from step 92 as input for one of several hash algorithms, such as SHA-224, SHA-256, SHA-384, SHA-512, SHA-512/224, SHA-512/256, or MD5. In step 96, the hash digest for $GOP_n$ is produced as output, which is based upon $GOP_n$ and $GOP_{n-1}$. The hash digest produced in step 96 is then placed in H-Frame 66. Alternatively, the hash digest produced in step 96 is then stored in a cloud-based location and a link to access the hash digest is stored within H-Frame 66. The hash digest produced in step 96 is used to formulate the series of GOPs into a GOP blockchain as illustrated in FIG. 5.

FIG. 4 illustrates a table 104 defining the format of the H-Frame for a Group of Pictures, such as the Groups of Pictures illustrated in FIG. 1, including GOP1 18, GOP2 22, GOP3 26, to include identifying a hash algorithm and the blockchain digest, which is the output 96 of the hash algorithm as shown in FIG. 3. Column 106 shows the byte(s) of interest to the H-Frame and column 108 shows the description of those bytes. As long as byte-0, 110, is not FEh, or FFh, then byte-0, 110, contains the declaration of the hash algorithm used as described in section 112, such as SHA-224 (00h), SHA-256 (01h), SHA-384 (02h), SHA-512 (03h), SHA-512/224 (04h), SHA-512/256 (05h), MD5 (6h), and the like, where the suffix "h" denotes hexadecimal. There are two hexadecimal digits in one byte. The H-Frame is not limited to the SHA algorithms shown in FIG. 4, and others may be added. If byte-0, 110, is FEh, an identifier is provided that there is a link to a cloud-based encryption key and a link to a cloud-based hash digest of the GOP 64 associated with the H-Frame as noted in 112. In some embodiments, GOP 64 may be encrypted with a key. The key used to encrypt GOP 64 may be stored in the cloud. Alternatively, if byte-0, 110, is FFh (1111 1111 binary), then go to the website or cloud to download the identifier of the hash algorithm as well as the value of the resulting hash digest as noted in 112. If byte-0, 110, is anything but FEh, or FFh, starting with byte-1, 114, the blockchain digest, in hexadecimal, is added, such as example digest 1ef801f01d5231845f1c5c92aae9511d282b44b8 . . . as shown in section 116. The length of the blockchain digest is determined by the SHA algorithm listed in byte-0, 110. For example, the SHA-2 family has six hash functions with digests (hash values) that are 224 bits (28 bytes), 256 bits (32 bytes), 384 bits (48 bytes) or 512 bits (64 bytes): SHA-224, SHA-256, SHA-384, SHA-512, SHA-512/224, SHA-512/ 256. Thus, once one of these hash algorithms is selected in byte-0, 110, the length in bytes of the resulting blockchain digest is known. An example of accessing an H-Frame where the SHA-256 hash algorithm is used is (with spaces added for readability) 01 1ef801f01d5231845f1c 5c92aae9511d282b44b8 a3b7c6d1e5f21234267a 2f3a(h), where the first 01h identifies the SHA-256 algorithm as having been used to produce the hash digest, and the remaining 64 hexadecimal numbers (2 hexadecimal numbers per byte times 32 bytes) are an example hash digest stored in bytes 1-32 (32 bytes times 8 bits per byte equals the 256 bit digest of SHA-256). If byte-0, 110, is FEh, then starting with byte-1, 114, a link is provided in section 116 to a cloud-based encryption key and a link to a cloud-based hash digest of the GOP 64 associated with the H-Frame. If byte-0, 110, is FFh, then starting with byte-1, 114, a link to a website or cloud for both the hash algorithm used and resulting digest is provided in section 116. Use of such a link could regulate access to the hash algorithm and digest to those who have access credentials. The links to the cloud-based hash digests are accessible without any security credentials for a public access blockchain system. Alternatively, the links to the cloud-based hash digests are accessible only with security credentials for a private access blockchain system.

FIG. 5 illustrates an exemplary blockchain 118 of multiple Group Of Pictures (GOP) as illustrated in FIG. 1: GOP-1 block 48, GOP-2 block 50, and GOP-3 block 52. GOP-1 block 48 includes as information a hash digest of itself, GOP-1 48, and a hash digest of a prior blockchain block (not shown). GOP-1 block 48 also includes as data all the Group Of Pictures GOP1 18. GOP-2 block 50 includes as information a hash digest of itself, GOP-2 50, as well as a hash digest of GOP-1 block 48. GOP-2 block 50 also includes as information all of Group Of Pictures GOP2 22 as data. GOP-3 block 52 includes a hash digest of itself, GOP-3 52, and a hash digest of the prior blockchain block GOP-2 50. GOP-3 block 52 also includes as data Group Of Pictures GOP3 26.

Figure 6:
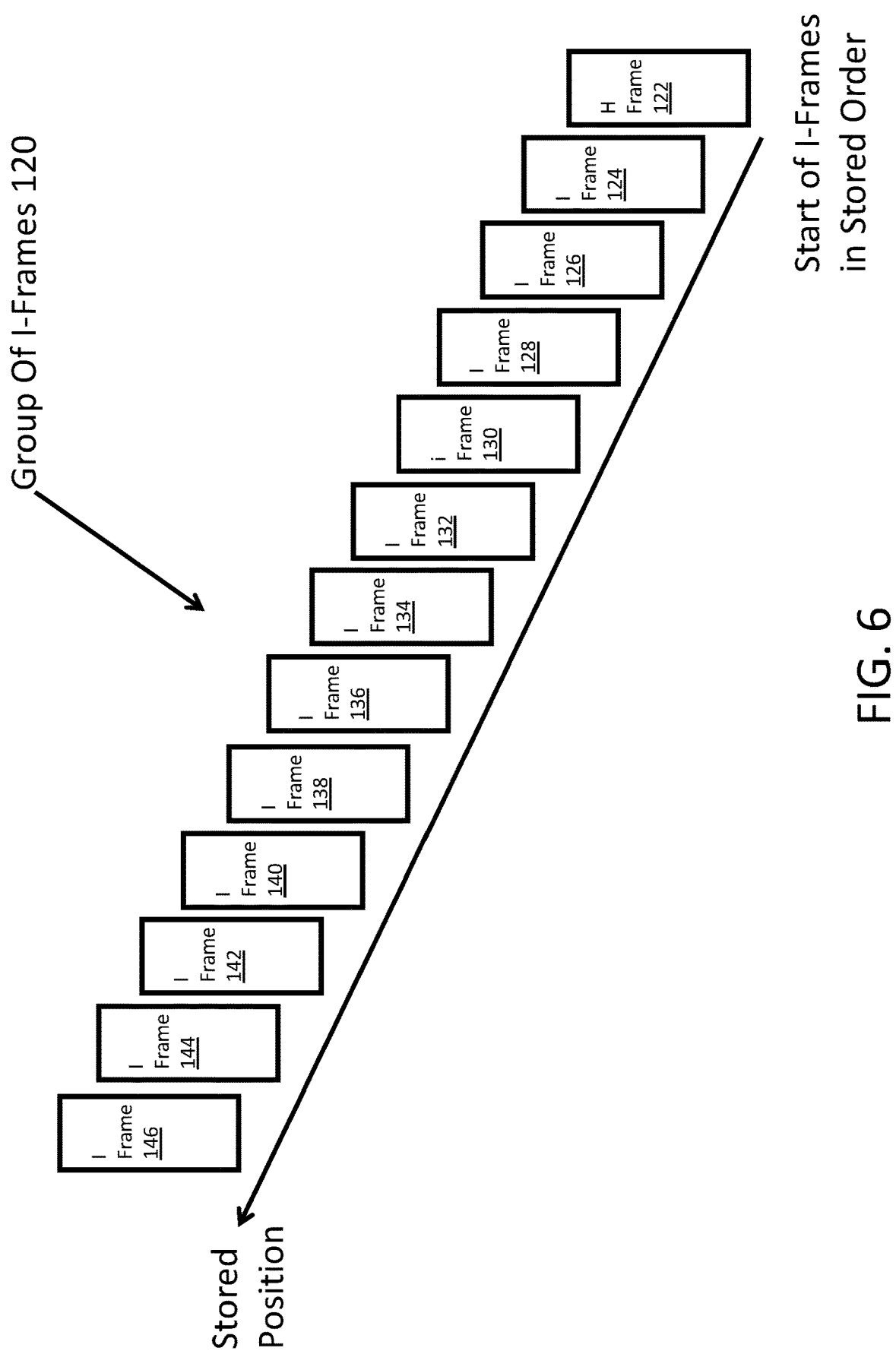
FIG. 6 illustrates a diagram of a series of I-Frames extracted from a series of Group-Of-Pictures (GOP), thereby forming a Group Of I-Frames (GOIF)

FIG. 6 illustrates a diagram of a series of I-Frames 120 formed of I-Frames 124, 126, 128, 130, 132, 134, 136, 138, 140, 142, 144, and 146 extracted from a series of Group- Of-Pictures (GOP), thereby forming a Group Of I-Frames (GOIF). GOIF 120 may be a subset of all of the I-Frames in the video stream or the entire video stream itself, is preceded by an H-Frame 122. A series of I-Frames may be provided by the Ikegami in its 100 Mb/second mode. In an alternate embodiment, the series of I-Frames is a series of JPEG (Joint Photographic Experts Group), JPEG-2000, TIFF (Tagged Image File Format), GIF (Graphics Interchange Format), PNG (Portable Network Graphics), or bitmap format, and the like. H-Frame 122 contains the blockchain digest of this series of I-Frames 120, regardless of whether there are or are not any intervening P and B frames. H-Frame 122 also contains the identification of which hash algorithm was used. The P-Frames and B-Frames contain motion-compensated difference information. The I-Frames are coded independently of all other frames, and hence the most important frames to protect. Thus, it may prove more efficient to form a blockchain hash digest and video blockchain off of just the I-Frames from a Group Of Pictures as opposed to including the P-Frames and B-Frames as well.

Figure 7:
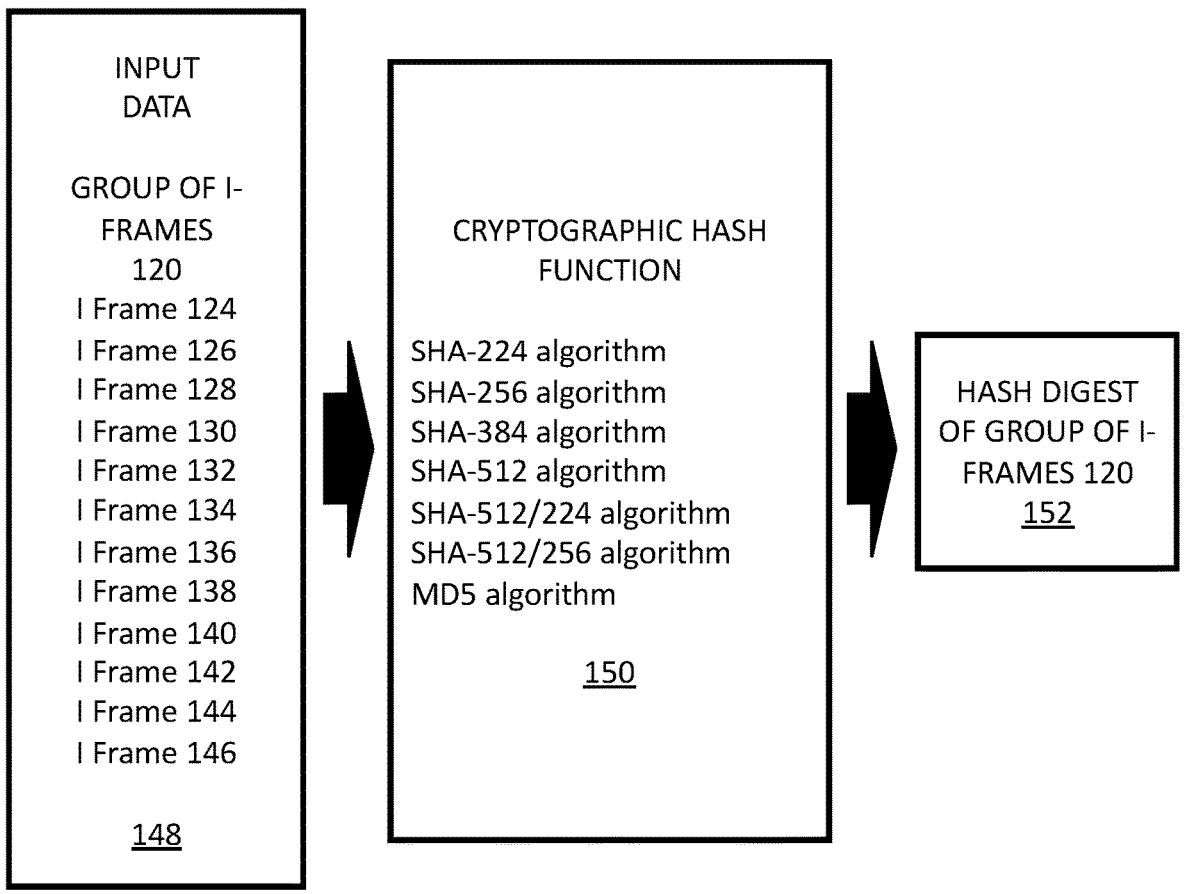
FIG. 7 illustrates a diagram depicting a process for forming a blockchain hash digest of a series of Group Of I-Frames (GOIF) based on a current GIF and a previous GIF.

FIG. 7 illustrates a diagram depicting a process for forming a blockchain hash digest of a series of Group Of I-Frames (GOIF) based on a current GOIF and a previous GOIF. When the GOIF is formed of all of the I-Frames in an entire video stream, there is a single GOIF. The input data 148 for the cryptographic hash function 150 includes Group Of I-Frames 120 that contains I-Frames 124, 126, 128, 130, 132, 134, 136, 138, 140, 142, 144, and 146. Cryptographic hash function module 386 takes input data 146 and applies cryptographic hash function 150 to the data. Cryptographic hash function 150 includes SHA-224 algorithm, SHA-256 algorithm, SHA-384 algorithm, SHA-512 algorithm, SHA-512/224 algorithm, SHA-512/256 algorithm, and MD5 algorithm. The use of these hash algorithms is exemplary. It is contemplated that any hash algorithm may be used in conjunction with this process. The output of the cryptographic hash function 150 is a hash digest of Group Of I-Frames 152, which is used to convert a series of GOIFs into a GOIF blockchain as illustrated in FIG. 9.

FIG. 8 illustrates a table 154 defining the format of the H-Frame for a GOIF 120 to include identifying a hash algorithm and the blockchain digest, which is the output 152 of this hash algorithm 150 as depicted in FIG. 7. Column 156 shows the byte(s) of interest to the H-Frame and column 162 shows the description of those bytes. As long as byte-0, 158, is not FEh, or FFh, then byte-0, 158, contains the declaration of the hash algorithm used as described in 164, such as SHA-224 (00h), SHA-256 (01h), SHA-384 (02h), SHA-512 (03h), SHA-512/224 (04h), SHA-512/256 (05h), MD5 (6h), and the like, where the suffix "h" denotes hexadecimal. There are two hexadecimal digits in one byte. The H-Frame is not limited to the SHA algorithms shown in FIG. 7, and others may be added. If byte-0, 158, is FEh, an identifier is provided that there is a link to a cloud-based encryption key and a link to a cloud-based hash digest of the GOIF 120 associated with the H-Frame as noted in section 164. In some embodiments, GOIF 120 may be encrypted with a key. The key used to encrypt GOIF 120 may be stored in the cloud. Alternatively, if byte-0, 158, is FFh (1111 1111 binary), then go to the website or cloud to download the identifier of the hash algorithm as well as the value of the resulting hash digest as noted in section 164. If byte-0, 158, is anything but FEh, or FFh, starting with byte-1, 160, the blockchain digest, in hexadecimal, is added, such as example digest 1ef801f01d5231845f1c5c92aae9511d282b 44b8 . . . as noted in section 166. The length of the blockchain digest is determined by the SHA algorithm listed in byte-0, 158. For example, the SHA-2 family has six hash functions with digests (hash values) that are 224 bits (28 bytes), 256 bits (32 bytes), 384 bits (48 bytes) or 512 bits (64 bytes): SHA-224, SHA-256, SHA-384, SHA-512, SHA-512/224, SHA-512/256. Thus, once one of these hash algorithms is selected in byte-0, 158, the length in bytes of the resulting blockchain digest is known. An example of accessing an H-Frame where the SHA-256 hash algorithm is used is (with spaces added for readability) 01 1ef801f01d5231845f1c 5c92aae9511d282b44b8 a3b7c6d1e5f21234267a 2f3a(h), where the first 01h identifies the SHA-256 algorithm as having been used to produce the hash digest, and the remaining 64 hexadecimal numbers (2 hexadecimal numbers per byte times 32 bytes) are an example hash digest stored in bytes 1-32 (32 bytes times 8 bits per byte equals the 256 bit digest of SHA-256) as shown in section 166. If byte-0, 158, is FEh, then starting with byte-1, 160, a link to a cloud-based encryption key and a link to a cloud-based hash digest of the GOP 64 associated with the H-Frame is provided in section 166. If byte-0, 158, is FFh, then starting with byte-1, 160, a link to a website or cloud for both the hash algorithm used and resulting digest is provided in section 166. Use of such a link could regulate access to the hash algorithm and digest to those who have access credentials. The links to the cloud-based hash digests are accessible without any security credentials for a public access blockchain system. Alternatively, the links to the cloud-based hash digests are accessible only with security credentials for a private access blockchain system.

Figure 9:
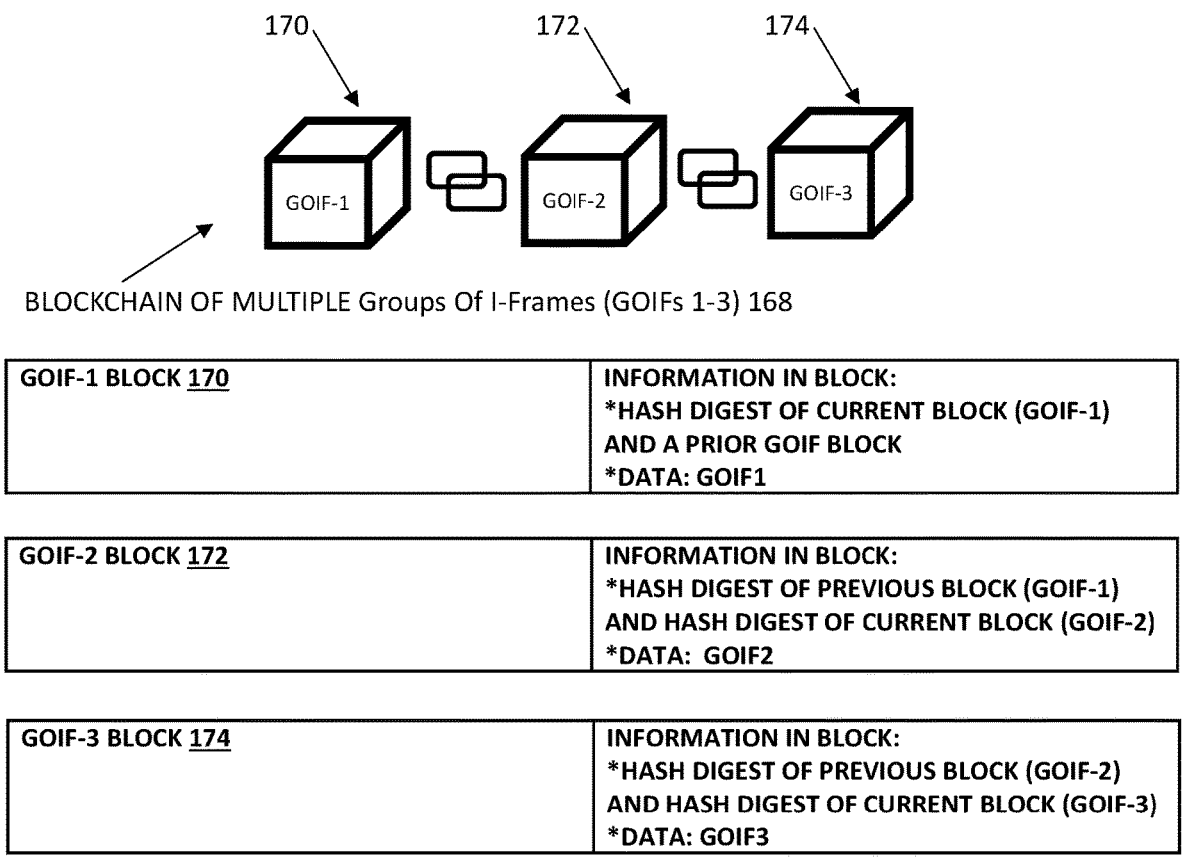
FIG. 9 illustrates an exemplary blockchain of multiple Group Of I-Frames (GOIF) formed from a series of Group Of Pictures (GOP)

FIG. 9 illustrates an exemplary blockchain 168 of multiple Group Of I-Frames (GOIF) 120 formed from a series of Group Of Pictures (GOP). In FIG. 9, there is an exemplary, but non-limiting blockchain of three GOIF blocks 170, 172, and 174. Blockchain 168 may contain any number of blockchain blocks, including a single block for when one GOIF contains all of the I-Frames from an entire video stream. GOIF-1 block 170 includes as information a hash digest of itself, GOIF-1 170, and a prior GOIF blockchain block (not shown). GOIF-1 block 170 also includes as data all the Group Of I-Frames GOIF1 (based on GOIF 120). GOIF-2 block 172 includes as information a hash digest of itself, GOIF-2 172, as well as a hash digest of GOIF-1 block 170. GOIF-2 block 172 also includes as information all of Group Of I-Frames GOIF2 (based on GOIF 120) as data. GOIF-3 block 174 includes a hash digest of itself, GOIF-3 174, and a hash digest of the prior blockchain block GOIF-2 172. GOIF-3 block 174 also includes as data Group Of I-Frames GOIF3 (based on GOIF 120).

Figure 22:
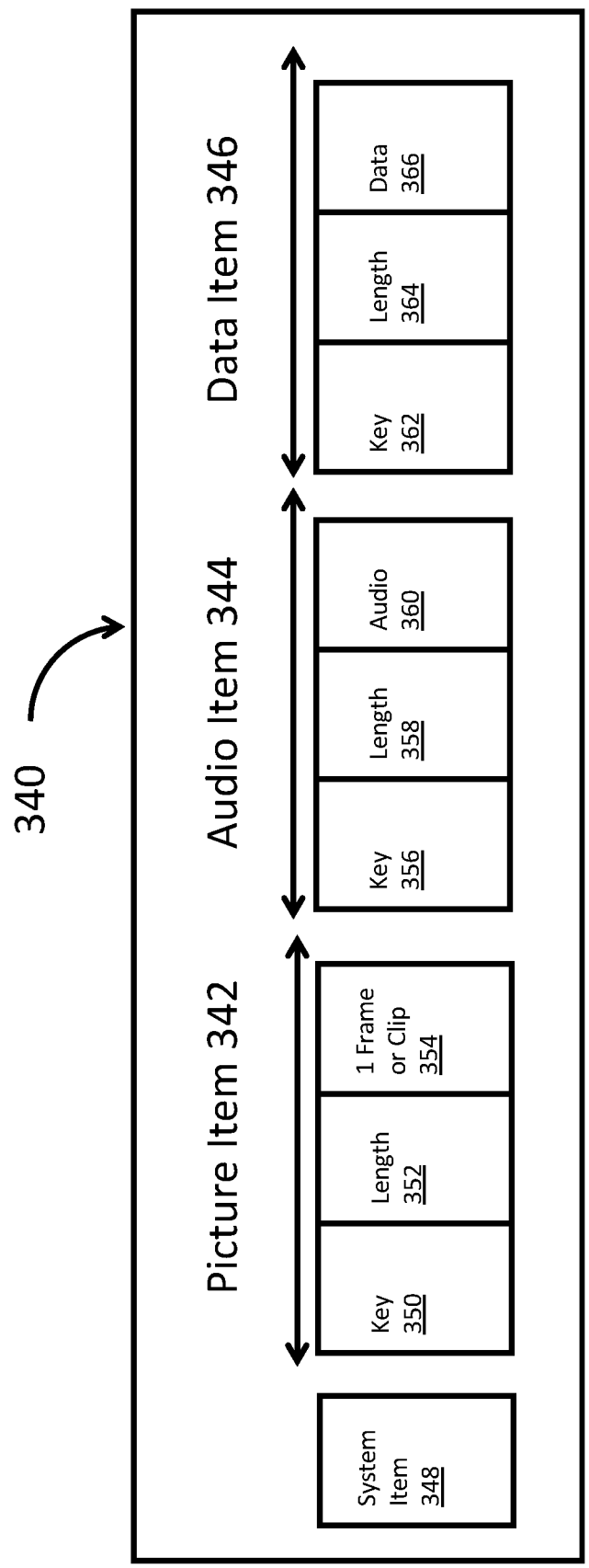
FIG. 22 illustrates a diagram of the MXF wrapped media file having picture, audio, and data items.

FIG. 10 illustrates a table 196 of MXF flags, which identify H, I, P, and B frames for use in combination with FIG. 22 to wrap video 2 and video blockchain 4 into an MXF wrapper 340. Table of MXF flags 196 contains 3 columns; byte column 198, function column 214, and description 216. From the bottom of the table, byte column 198 shows bit 1 and least-significant bit 0, 200, which define I-Frame 00 (no prediction), P-Frame 10 (forward prediction from previous frame), B-Frame 11 (forward & backward prediction), and H-Frame 01 (blockchain digest). If the frame is an H-Frame (blockchain digest), set bit 2 202 flag to "1;" otherwise, it is set to "0." Bit 3 204 is defined in SMPTE 381M. This flag was defined to cover the case where there is a large number of B or P frames between anchor frames, or when the temporal offset is very large. This flag is set to a "1" when either TemporalOffset or KeyFrameOffset is outside −128>value>127. Bit 5 208 and bit 4 206 flags can be set in "precise mode," or in naïve mode. Precise mode can be useful to optimize decoder fetches when not all the bidirectional prediction options are used; e.g., in an MPEG-2 closed GOP environment. The naïve setting for Bits 5, 4 are 00 = = I-Frame, 10 = = P-Frame, 11 = = B-Frame, and 01 = = H-Frame, which have the same values as bits 1, 0 200. In precise mode, the frames are inspected for their prediction dependencies and set as follows: 00 = = I-Frame (no prediction), 10 = = P-Frame (forward prediction from previous frame), 01 = = B-Frame (backward prediction from future frame), and 11 = = B-Frame (forward and backward prediction). Bit 6 210 flag is set to "1" if the IndexEntry points to a frame including a sequence header; otherwise, it is set to "0." Most-significant-bit 7 212 is set to "1" to allow randomly accessing this frame and start decoding; otherwise, it is set to "0." In FIG. 11, the most-significant-bit (MSB) 7 212 is furthest to the left and least-significant-bit (LSB) 0 is furthest to the right in the string of eight bits comprising byte 198. In FIG. 10, an H-Frame is declared three ways. By bits 1, 0 200 being set to "01," by bit 2 202 set to "1," and the naïve settings for bits 5, 4 208, 206 set to "01." Bit 7 212 may be set to "1" to allow random access of the H-Frame and start it decoding, to allow access to the blockchain digest inside of the H-Frame. If an H-Frame is declared in bits 2 202 or 1,0 200, and the precise mode is used in bits 5, 4 208, 206, then bits 5, 4 are ignored. The blockchain digest within the H-Frame is a hexadecimal string, a portion of which may look like this: 1ef801f01d5231845f1c5c92aae9511d282b44b8 . . . , representing the output of the blockchain hash of the GOP or I-Frames associated with that H-Frame. The hash algorithm, such as SHA-256, would also be declared in the H-Frame. In an alternate embodiment, a second byte is added to allow declaration of the H-Frame.

FIG. 11 illustrates a detailed expansion of FIGS. 1-10, where MXF flags are shown for individual H-frames and accompanying I, P, and B frames for a Group Of Pictures (GOP). FIG. 11 shows a portion 176 of FIGS. 22 and 23 with greatly enhanced detail. Body partition 178 is followed by Index Segment #1 180, then body partition 182. Then Key+Length 184 contains byte 198H flag from FIG. 10 set to 10010101 for H-Frame 66, indicating that bits 1, 0 being set to "01," by bit 2 set to "1," and the naïve settings for bits 5, 4 set to "01." Most-Significant-Bit 7 is set to "1" to allow random access of the H-Frame and start it decoding, to allow random access to the blockchain digest inside of the H-Frame. In an alternate embodiment, the byte 198H flag is set to 00010101 where setting most-significant-bit 7 to 0 prohibits random access to the H-Frame. Key+Length 186 contains byte 198I flag from FIG. 10 set to 00000000 for I-Frame 68. Key+Length 188, 190, and 194 contains byte 198B flag from FIG. 10 set to 00110011 for B-Frames 70, 72, and 76. Finally, Key+Length 192 contains byte 198P flag from FIG. 10 set to 00100010 for P-Frame 74. Thus, the H, I, P, and B frames are clearly identifiable and distinguished from one another.

Figure 12:
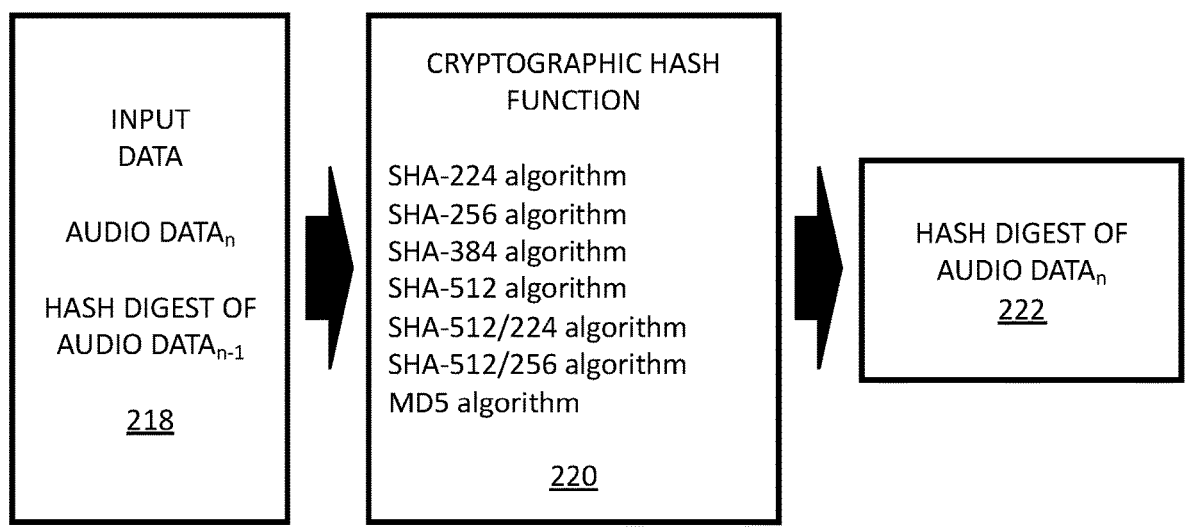
FIG. 12 illustrates a diagram depicting a process for forming a blockchain hash digest of a series of Audio blocks based on a current Audio block and a previous Audio block.

FIG. 12 illustrates a diagram depicting a process for forming a blockchain hash digest of a series of audio blocks based on a current audio block and a previous audio block. The process of FIG. 12 is used in conjunction with audio data in FIG. 1 including AUDIO1 30 and AUDIO2 34 data files. A cryptographic hash function module 386, shown in FIG. 27, follows the process shown in FIG. 12 to generate a blockchain hash digest of a series of audio files, such as AUDIO1 30 and AUDIO2 34 data files shown in FIG. 1. In step 218, input data is acquired that includes AUDIO DATA$_n$ and HASH DIGEST OF AUDIO DATA$_{n-1}$. AUDIO DATA$_n$ is the $n^{th}$ data file of the series of audio data files. HASH DIGEST OF AUDIO DATA$_{n-1}$ is the hash digest of the n–1$^{th}$ data file in the series of audio data files. In step 220, cryptographic hash function module 386 takes the input data 218 and applies it to a cryptographic hash function, such as an SHA-224 algorithm, SHA-256 algorithm, SHA-384 algorithm, SHA-512 algorithm, SHA-512/224 algorithm, SHA-512/256 algorithm, or MD5 algorithm. Note that this listing of algorithms for the hash are merely exemplary. The outcome of applying this cryptographic hash function in step 220 is produced in step 222 in the form of a HASH DIGEST OF AUDIO DATA$_n$, which is used to provide hash digest information on audio files, such as AUDIO1 30 and AUDIO2 34, in the formulation of converting a series of audio files into an audio file blockchain as illustrated in FIG. 13.

FIG. 13 illustrates an exemplary blockchain of multiple audio blocks 224. Blockchain 224 is shown as having three exemplary blocks 54, 56, and 230. The use of three blocks to form blockchain 224 is merely illustrative and is non-limiting. Audio blocks AUD-1 54 and AUD-2 56 are illustrated in FIG. 1. AUD-3 230, not shown in FIG. 1, is provided for illustrative purposes to further show the interlinking nature of the blockchain data structure for blockchain of audio files 224. AUDIO1 blockchain block 54, AUD-1, includes as data AUDIO1 30 from FIG. 1. AUDIO1 blockchain block 54, AUD-1, also includes a hash of the current block (AUD-1 54) and a hash digest of the prior audio block, not shown). AUDIO2 blockchain block 56, AUD-2, includes as data AUDIO2 34 as shown in FIG. 1. AUDIO2 blockchain block 56 also includes a hash digest of itself and a hash digest of the previous block, AUD-1 56. AUDIO3 blockchain block 230, AUD-3, includes as data an AUDIO3 audio data file. AUDIO3 blockchain block 230 also includes a hash digest of itself and a hash digest of the previous blockchain block AUD-2 56.

FIG. 14 illustrates a table 232 defining the format of the AH-Frame, such as AH-Frame 28 and AH-Frame 32, for an audio data file to include identifying a hash algorithm and the blockchain digest, which is the output 222 of this hash algorithm 220 from FIG. 12. Column 234 shows the byte(s) of interest to the AH-Frame and column 240 shows the description of those bytes. As long as byte-0, 236, is not FEh, or FFh, then byte-0, 236, contains the declaration of the hash algorithm used as described in 242, such as SHA-224 (00h), SHA-256 (01h), SHA-384 (02h), SHA-512 (03h), SHA-512/224 (04h), SHA-512/256 (05h), MD5 (6h), and the like, where the suffix "h" denotes hexadecimal. There are two hexadecimal digits in one byte. The AH-Frame is not limited to the SHA algorithms shown in FIG. 12, and others may be added. If byte-0, 242, is FEh, an identifier is provided that there is a link to a cloud-based encryption key and a link to a cloud-based hash digest of the audio files 30 and 34 associated with the AH-Frames 28 and 32 as noted in section 242. In some embodiments, audio files 30 and 34 may be encrypted with a key. The key used to encrypt audio files 30 and 34 may be stored in the cloud. Alternatively, if byte-0, 236, is FFh (1111 1111 binary), then go to the website or cloud to download the identifier of the hash algorithm as well as the value of the resulting hash digest as noted in section 242. If byte-0, 236, is anything but FEh, or FFh, starting with byte-1, 238, the blockchain digest, in hexadecimal, is added, such as example digest 1ef801f01d5231845f1c5c92aae9511d282b44b8 . . . as noted in section 244. The length of the blockchain digest is determined by the SHA algorithm listed in byte-0, 236. For example, the SHA-2 family has six hash functions with digests (hash values) that are 224 bits (28 bytes), 256 bits (32 bytes), 384 bits (48 bytes) or 512 bits (64 bytes): SHA-224, SHA-256, SHA-384, SHA-512, SHA-512/224, SHA-512/256. Thus, once one of these hash algorithms is selected in byte-0, 236, the length in bytes of the resulting blockchain digest is known. An example of accessing an AH-Frame where the SHA-256 hash algorithm is used is (with spaces added for readability) 01 1ef801f01d5231845f1c 5c92aae9511d282b44b8 a3b7c6d1e5f21234267a 2f3a(h), where the first 01h identifies the SHA-256 algorithm as having been used to produce the hash digest, and the remaining 64 hexadecimal numbers (2 hexadecimal numbers per byte times 32 bytes) are an example hash digest stored in bytes 1-32 (32 bytes times 8 bits per byte equals the 256 bit digest of SHA-256) as shown in section 244. If byte-0, 236, is FEh, then starting with byte-1, 238, a link to a cloud-based encryption key and a link to a cloud-based hash digest of the audio files 30 and 34 associated with the AH-Frames 28 and 32 is provided in section 244. If byte-0, 236, is FFh, then starting with byte-1, 238, a link to a website or cloud for both the hash algorithm used and resulting digest is provided in section 244. Use of such a link could regulate access to the hash algorithm and digest to those who have access credentials.

FIG. 15 illustrates a table 262 of MXF flags, which identify AH-Frames 28 and 32 for use in combination with FIG. 22 to wrap video 2 and video blockchain 4 into an MXF wrapper 340. Table of MXF flags 262 contains 3 columns; byte column 264, function column 276, and description 278. From the bottom of the table, byte column 264 shows bit 1 and least-significant bit 0, 266, which define the audio file type such as 00 for MP3, 10 for AAC, 11 for WMA, and 01 for an AH-FRAME (blockchain digest or links thereto) as shown in column 278. If the frame is an AH-Frame (blockchain digest), set bit 2 268 flag to "1;" otherwise, it is set to "0." Bit 3 270 is defined in SMPTE 381M. This flag was defined to cover the case where there is a large number of audio clips between audio anchors, or when the temporal offset is very large. This flag is set to a "1" when either TemporalOffset or KeyFrameOffset is outside −128>value>127. Bit 5, 4 271 flags can be set in naïve mode. The naïve setting for Bits 5, 4 are 00 for MP3, 10 for AAC, 11 for WMA, and 01 for an AH-FRAME (blockchain digest or links thereto) as shown in column 278, which have the same values as bits 1, 0 266. Bit 6 272 flag is set to "1" if the IndexEntry points to a frame including a sequence header; otherwise, it is set to "0." Most-significant-bit 7 274 is set to "1" to allow randomly accessing this frame and start decoding; otherwise, it is set to "0." In FIG. 16, the most-significant-bit (MSB) 7 274 is furthest to the left and least-significant-bit (LSB) 0 is furthest to the right in the string of eight bits comprising byte 264. In FIG. 15, an AH-Frame is declared three ways. By bits 1, 0 266 being set to "01," by bit 2 268 set to "1," and the naïve settings for bits 5, 4 271 set to "01." Bit 7 274 may be set to "1" to allow random access of the AH-Frame and start it decoding, to allow access to the blockchain digest inside of the AH-Frame. The blockchain digest within the AH-Frame is a hexadecimal string, a portion of which may look like this: 1ef801f01d5231845f1c5c92aae9511d282b44b8 . . . , representing the output of the blockchain hash of the audio data associated with that AH-Frame. The hash algorithm, such as SHA-256, would also be declared in the AH-Frame. In an alternate embodiment, a second byte is added to allow declaration of the AH-Frame.

Figure 16:
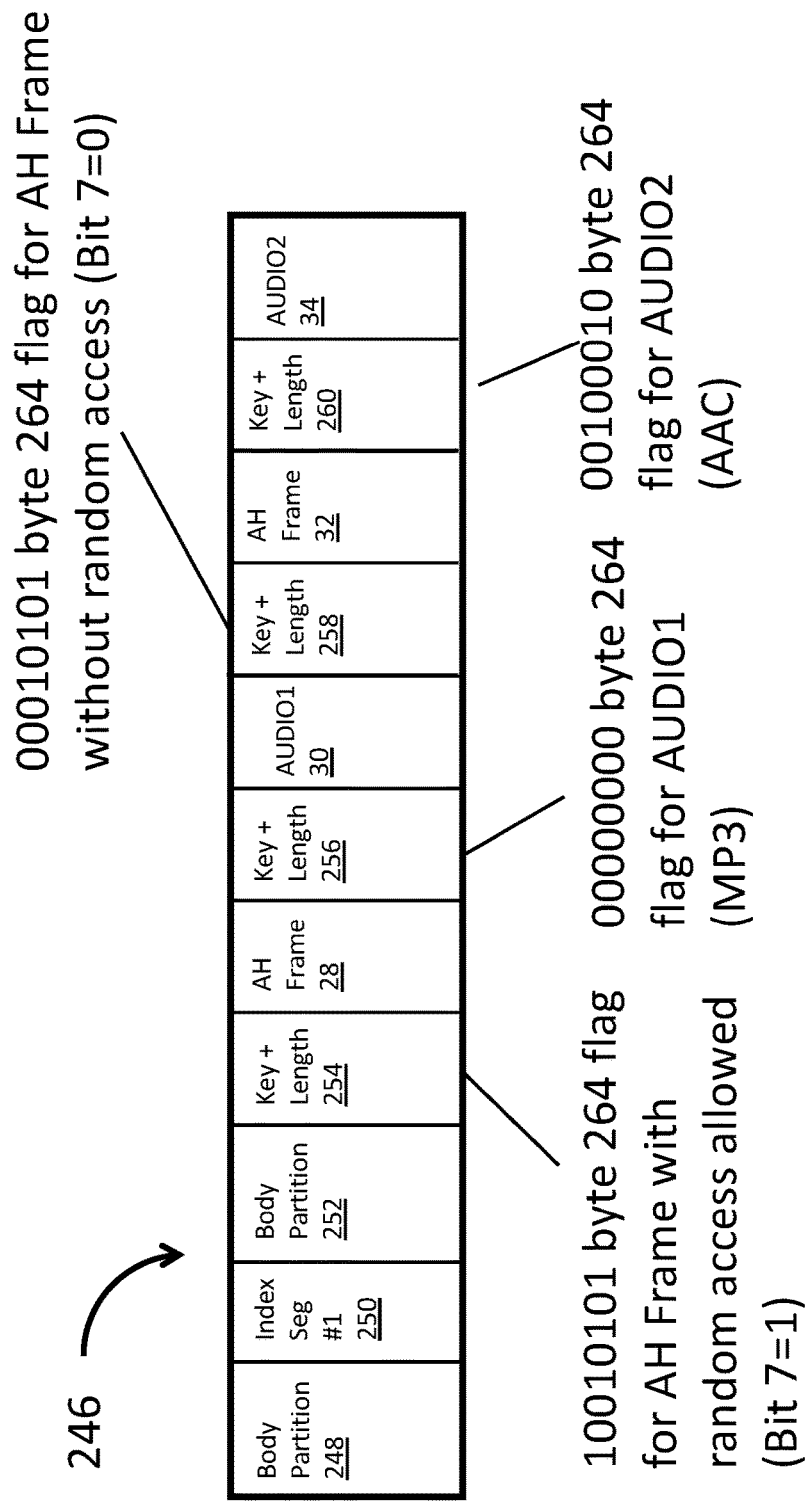
FIG. 16 illustrates a detailed expansion of FIG. 1, where MXF flags are shown for individual AH-frames and accompanying audio blocks.

FIG. 16 illustrates a detailed expansion of FIG. 1, where MXF flags are shown for individual AH-frames and accompanying audio blocks. FIG. 16 shows a portion 246 of FIGS. 22 and 23 with greatly enhanced detail. Body partition 248 is followed by Index Segment #1 250, then body partition 252. Then Key+Length 254 contains byte 264 flag for AH-Frame from FIG. 15 set to 10010101 for AH-Frame 28, indicating that bits 1, 0 being set to "01," by bit 2 set to "1," and the naïve settings for bits 5, 4 set to "01." Most-Significant-Bit 7 is set to "1" to allow random access of the AH-Frame and start it decoding, to allow random access to the blockchain digest inside of the AH-Frame. In an alternate embodiment, the byte 264 flag is set to 00010101 where setting most-significant-bit 7 to 0 prohibits random access to the AH-Frame. Key+Length 256 contains byte 264 flag for an AUDIO1 30 MP3 file from FIG. 15 set to 00000000. Key+Length 258, contains byte 264 flag for AH-Frame 32 from FIG. 15 set to 00010101. Finally, Key+Length 260 contains byte 264 flag for AUDIO2 34 AAC from FIG. 15 set to 00100010. Thus, the AH-Frames 28 and 32 frames are clearly identifiable and distinguished from one another along with AUDIO1 file 30 and AUDIO2 file 34.

Figure 17:
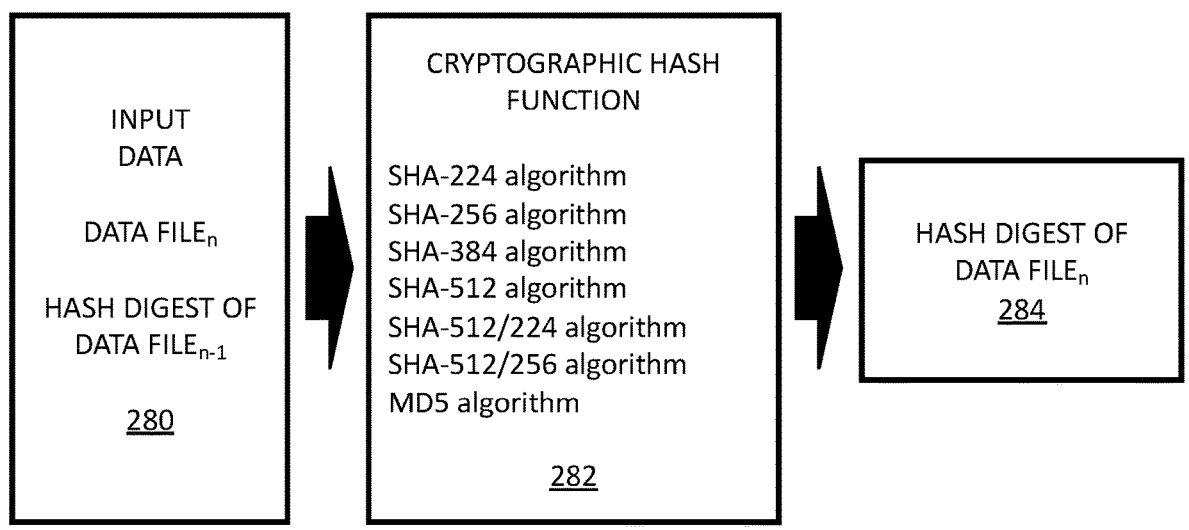
FIG. 17 illustrates a diagram depicting a process for forming a blockchain hash digest of a series of data blocks based on a current data block and a previous data block.

FIG. 17 illustrates a diagram depicting a process for forming a blockchain hash digest of a series of data blocks 38, 42, and 46 based on a current data block and a previous data block. The process of FIG. 17 is used in conjunction with data file blocks 38, 42, and 46 in FIG. 1. A cryptographic hash function module 386, shown in FIG. 27, follows the process shown in FIG. 17 to generate a blockchain hash digest of a series of data file blocks, such as DATA1 38, DATA2 42, and DATA3 46 shown in FIG. 1. In step 280, input data is acquired that includes DATA FILE$_n$ and HASH DIGEST OF DATA FILE$_{n-1}$. DATA FILE$_n$ is the $n^{th}$ data file block of the series of data files. HASH DIGEST OF DATA FILE$_{n-1}$ is the hash digest of the n−$1^{th}$ data file in the series of data file blocks. In step 282, cryptographic hash function module 386 takes the input data 280 and applies it to a cryptographic hash function, such as an SHA-224 algorithm, SHA-256 algorithm, SHA-384 algorithm, SHA-512 algorithm, SHA-512/224 algorithm, SHA-512/256 algorithm, or MD5 algorithm. Note that this listing of algorithms for the hash are merely exemplary. The outcome of applying this cryptographic hash function in step 282 is produced in step 284 in the form of a HASH DIGEST OF DATA FILE$_n$, which is used to provide hash digest information on data files, such as DATA1 38, DATA2 42, and DATA3 46, in the formulation of converting a series of data files into a data file blockchain as illustrated in FIG. 18.

Figure 18:
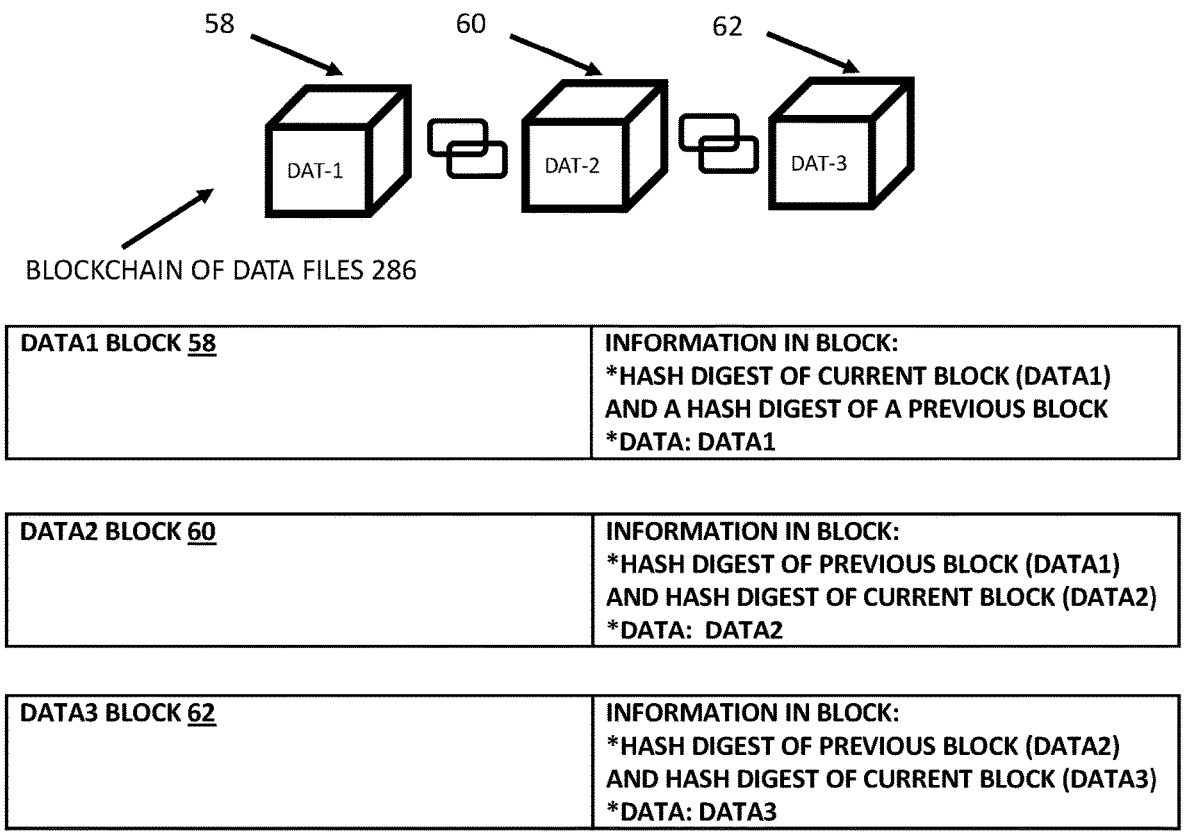
FIG. 18 illustrates an exemplary blockchain of multiple data blocks.

FIG. 18 illustrates an exemplary blockchain 286 of multiple data blocks. Blockchain 286 is shown as having three exemplary blocks 58, 60, and 62. The use of three blocks to form blockchain 286 is merely illustrative and is non-limiting. Data blocks DAT-1 58, DAT-2 60, and DAT-3 62 are illustrated in FIG. 1. DATA1 blockchain block 58, DAT-1, includes as data DATA1 38 from FIG. 1. DATA1 blockchain block 58, DAT-1, also includes a hash of the current block (DAT-1 58) and a hash digest of the prior audio block, not shown). DATA2 blockchain block 60, DAT-2, includes as data DATA2 42 as shown in FIG. 1. DATA2 blockchain block 60 also includes a hash digest of itself and a hash digest of the previous block, DAT-1 58. DATA3 blockchain block 62, DAT-3, includes as data DATA3 46 data file from FIG. 1. DAT-3 blockchain block 62 also includes a hash digest of itself and a hash digest of the previous blockchain block DAT-2 60.

FIG. 19 illustrates a table 294 defining the format of the DH-Frame for a data block to include identifying a hash algorithm and the blockchain digest, which is the output 284 of this hash algorithm 282 from FIG. 19. Column 296 shows the byte(s) of interest to the DH-Frame and column 300 shows the description of those bytes. As long as byte-0, 299, is not FEh, or FFh, then byte-0, 299, contains the declaration of the hash algorithm used as described in 302, such as SHA-224 (00h), SHA-256 (01h), SHA-384 (02h), SHA-512 (03h), SHA-512/224 (04h), SHA-512/256 (05h), MD5 (6h), and the like, where the suffix "h" denotes hexadecimal. There are two hexadecimal digits in one byte. The DH-Frame is not limited to the SHA algorithms shown in FIG. 17, and others may be added. If byte-0, 299, is FEh, an identifier is provided that there is a link to a cloud-based encryption key and a link to a cloud-based hash digest of the data files 38, 42, and 46 associated with the DH-Frames 36, 40, and 44 as noted in section 302. In some embodiments, data files 38, 42, and 44 may be encrypted with a key. The key used to encrypt data files 38, 42, and 44 may be stored in the cloud. Alternatively, if byte-0, 299, is FFh (1111 1111 binary), then go to the website or cloud to download the identifier of the hash algorithm as well as the value of the resulting hash digest as noted in section 302. If byte-0, 236, is anything but FEh, or FFh, starting with byte-1, 298, the blockchain digest, in hexadecimal, is added, such as example digest 1ef801f01d5231845f1c5c92aae9511d282b 44b8 . . . as noted in section 304. The length of the blockchain digest is determined by the SHA algorithm listed in byte-0, 299. For example, the SHA-2 family has six hash functions with digests (hash values) that are 224 bits (28 bytes), 256 bits (32 bytes), 384 bits (48 bytes) or 512 bits (64 bytes): SHA-224, SHA-256, SHA-384, SHA-512, SHA-512/224, SHA-512/256. Thus, once one of these hash algorithms is selected in byte-0, 299, the length in bytes of the resulting blockchain digest is known. An example of accessing an DH-Frame where the SHA-256 hash algorithm is used is (with spaces added for readability) 01 1ef801f01d5231845f1c 5c92aae9511d282b44b8 a3b7c6d1e5f21234267a 2f3a(h), where the first 01h identifies the SHA-256 algorithm as having been used to produce the hash digest, and the remaining 64 hexadecimal numbers (2 hexadecimal numbers per byte times 32 bytes) are an example hash digest stored in bytes 1-32 (32 bytes times 8 bits per byte equals the 256 bit digest of SHA-256) as shown in section 304. If byte-0, 299, is FEh, then starting with byte-1, 298, a link to a cloud-based encryption key and a link to a cloud-based hash digest of the data files 38, 42, and 44 associated with the DH-Frames 36, 40, and 44 is provided in section 304. If byte-0, 299, is FFh, then starting with byte-1, 298, a link to a website or cloud for both the hash algorithm used and resulting digest is provided in section 304. Use of such a link could regulate access to the hash algorithm and digest to those who have access credentials.

FIG. 20 illustrates a table of MXF flags 322, which identify DH-Frames 36, 40, and 44 for use in combination with FIG. 22 to wrap video 2 and video blockchain 4 into an MXF wrapper 340. Table of MXF flags 322 contains 3 columns; byte column 324, function column 336, and description 338. From the bottom of the table, byte column 324 shows bit 1 and least-significant bit 0, 326, which define the audio file type such as 00 for .PDF files, 10 for .EXE executable files, 11 for .SYS system files, and 01 for a DH-FRAME (blockchain digest or links thereto) as shown in column 338. The choice of these file types is merely exemplary. It is contemplated that any type of data file may be identified as the data file type for the 1, 0 byte 326. If the frame is a DH-Frame (blockchain digest), set bit 2 328 flag to "1;" otherwise, it is set to "0." Bit 3 330 is defined in SMPTE 381M. This flag was defined to cover the case where there is a large number of data files between data anchors, or when the temporal offset is very large. This flag is set to a "1" when either TemporalOffset or KeyFrameOffset is outside –128>value>127. Bit 5, 4 271 flags can be set in naïve mode. The naïve setting for Bits 5, 4 are 00 for .PDF files, 10 for .EXE executable files, 11 for .SYS system files, and 01 for a DH-FRAME (blockchain digest or links thereto) as shown in column 338, which have the same values as bits 1, 0 326. Bit 6 332 flag is set to "1" if the IndexEntry points to a frame including a sequence header; otherwise, it is set to "0." Most-significant-bit 7 334 is set to "1" to allow randomly accessing this frame and start decoding; otherwise, it is set to "0." In FIG. 21, the most-significant-bit (MSB) 7 334 is furthest to the left and least-significant-bit (LSB) 0 is furthest to the right in the string of eight bits comprising byte 324. In FIG. 20, a DH-Frame is declared three ways. By bits 1, 0 326 being set to "01," by bit 2 328 set to "1," and the naïve settings for bits 5, 4 331 set to "01." Bit 7 334 may be set to "1" to allow random access of the DH-Frame and start it decoding, to allow access to the blockchain digest inside of the DH-Frame. The blockchain digest within the DH-Frame is a hexadecimal string, a portion of which may look like this: 1ef801f01d5231845f1c5c92aae9511d282b44b8 . . . , representing the output of the blockchain hash of the audio data associated with that DH-Frame. The hash algorithm, such as SHA-256, would also be declared in the DH-Frame. In an alternate embodiment, a second byte is added to allow declaration of the DH-Frame.

FIG. 21 illustrates a detailed expansion of FIG. 1, where MXF flags are shown for individual DH-frames and accompanying data blocks. FIG. 21 shows a portion 306 of FIGS. 22 and 23 with greatly enhanced detail. Body partition 308 is followed by Index Segment #1 310, then body partition 312. Then Key+Length 314 contains byte 324 flag for DH-Frame from FIG. 20 set to 10010101 for DH-Frame 36, indicating that bits 1, 0 being set to "01," by bit 2 set to "1," and the naïve settings for bits 5, 4 set to "01." Most-Significant-Bit 7 is set to "1" to allow random access of the DH-Frame and start it decoding, to allow random access to the blockchain digest inside of the DH-Frame. In an alternate embodiment, the byte 324 flag is set to 00010101 where setting most-significant-bit 7 to 0 prohibits random access to the DH-Frame. Key+Length 316 contains byte 324 flag for an DATA1 38 .PDF file from FIG. 20 set to 00000000. Key+Length 318, contains byte 324 flag for DH-Frame 40 from FIG. 20 set to 00010101. Finally, Key+Length 320 contains byte 324 flag for DATA2 42 .EXE from FIG. 20 set to 00100010. Thus, the DH-Frames 36 and 40 frames are clearly identifiable and distinguished from one another along with DATA1 file 38 and DATA2 file 40.

FIG. 22 illustrates a diagram of the MXF wrapped media file 340 having picture 342, audio 344, and data 346 items. MXF wrapped media file 340 is a Material eXchange Format (MXF) File. Material eXchange Format (MXF) Files are discussed in length in the publication, which is hereby incorporated by reference in its entirety: Wells, Nick, ed. The MXF Book, Introduction to the Material eXchange Format. By Bruce Devlin and Jim Wilkinson. Amsterdam: Focal Press, 2006. Print. ISBN 13: 9780240806938. System item 348 is an SDTI-CP compatible system item that includes a system metadata pack, package metadata set, picture metadata set, sound metadata set, data metadata set, and control data set. The picture item 342 includes of key 350, length 352, and one or more frames or clips of pictures or video 354, such as the Groups of Pictures from video 2 and video blockchain 4 from FIG. 1. The audio item 344 includes key 356, length 358, and audio 360. Audio 360 may be in the DOLBY™ AC-3 format, DOLBY™ AC-4 format, DOLBY™ TrueHD, DOLBY E, ALE (APPLE™ Lossless Encoder), ALAC (APPLE™ Lossless Audio Codec), AAC (Advanced Audio Encoding), DVD-A (DVD-Audio), AIFF (Audio Interchange File Format), MP3, and the like. Finally, data item 346 includes key 362, length 364, and data 366. For brevity, only one picture item, one sound item, and one data item is shown in FIG. 22, but more could be included. It should be noted that the MXF wrap 340 need not be inclusive of pictures/video 342, audio 344, and data 346. MXF wrap 340 may only contain audio 344 and data 346, or may contain only audio 344, or may contain picture/video 342 and data 346, or may contain only picture/video 342, or any combination thereof. Picture item 342 is an essence generic container that contains the video essence 354. Audio item 344 is an essence generic container that contains the audio essence 360. Data item 346 is an essence generic container that contains data essence 366.

Figure 23:
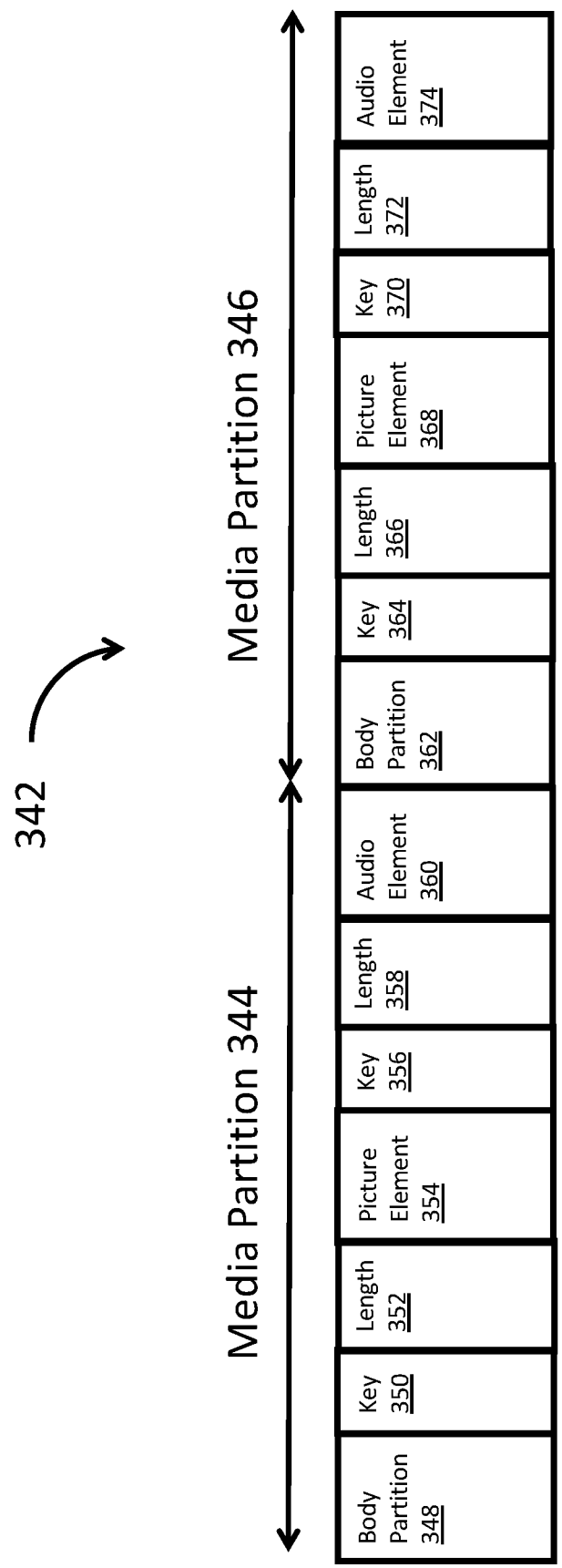
FIG. 23 illustrates a diagram of a partitioned media generic essence file as a part of a Material eXchange Format (MXF) File.

FIG. 23 illustrates a diagram of a partitioned media file generic essence container 342 that includes pictures and audio as a part of a Material eXchange Format (MXF) File 340. Partitioned media file 342 is provided to illustrate how large multiple media files may be incorporated into Material eXchange Format (MXF) File 340 through the use of partitions. Media partition 344 includes body partition 348 followed by key 350, length 352, and picture element 354. Media partition 344 further includes key 356, length 358, and audio element 360. Media partition 344 may for example represent a video scene 10. Media partition 346 may represent a successive video scene such as video scene 12. Media partition 346 includes body partition 362, key 364, length 366, picture element 368, key 370, length 372, and audio 374. For brevity, only two partitions 344 and 346 are shown in FIG. 23, but more could be used in practice, or the picture and audio/sound could not be partitioned at all.

Figure 24:
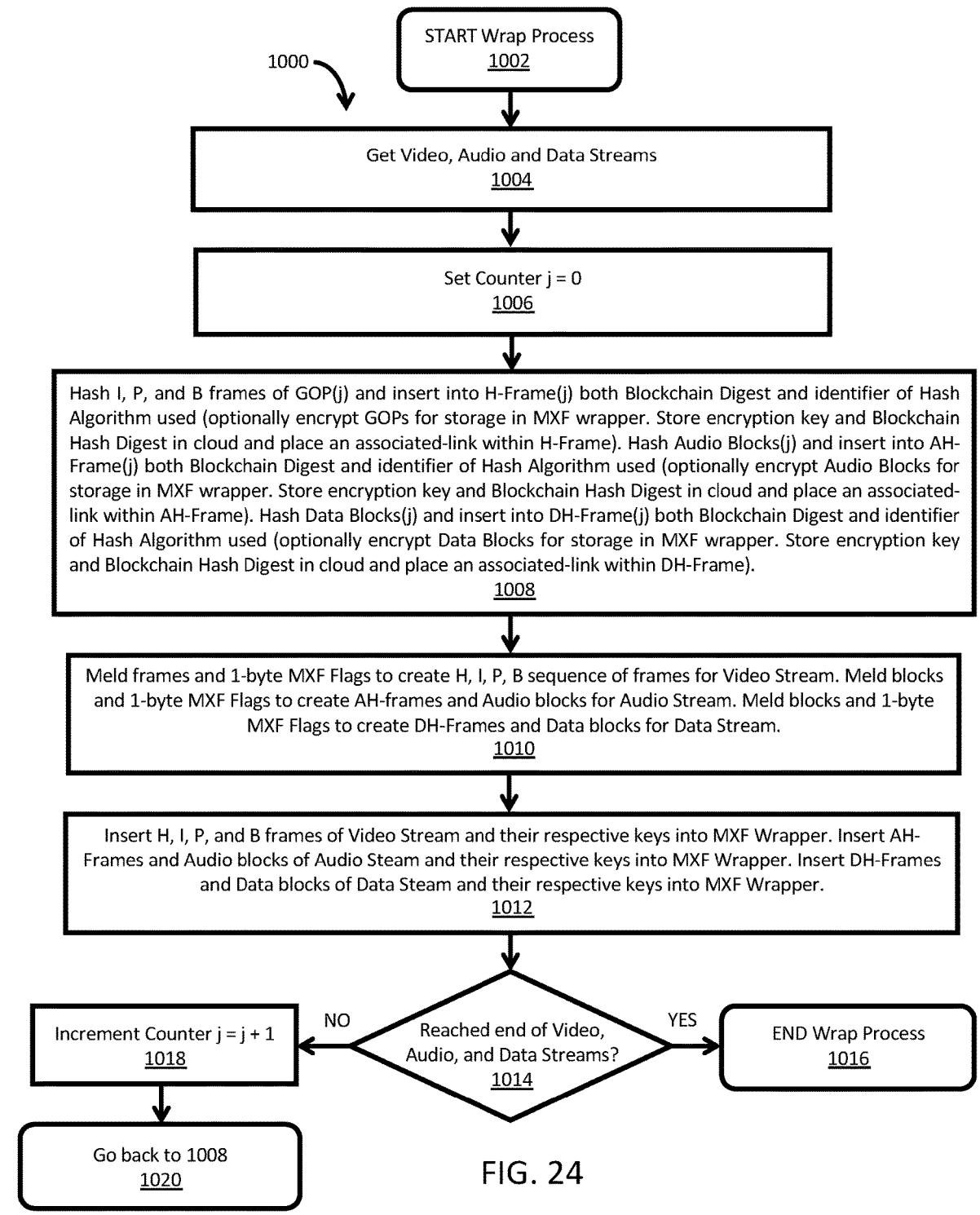
FIG. 24 depicts a flowchart illustrating a process for the wrapping of a media file including video, audio, and data into a Material eXchange Format (MXF) File where the Video Blockchain Hash Digest is based on a series of GOPs.

FIG. 24 depicts a flowchart 1000 illustrating a process for the wrapping of a media file including video, audio, and data into a Material eXchange Format (MXF) File 340 where the video blockchain hash digest is based on a series of GOPs. The process for wrapping a video media file 2, shown in FIG. 1, within a Material eXchange Format (MXF) File 340 begins with START 1002. This wrapping flowchart process 1000 is executed by an MXF File System Manager 376, depicted in FIG. 27. MXF File System Manager 376 is a series of software modules running on a hardware system as described in FIGS. 27-30. In step 1004, MXF File System Manager 376 acquires media file 2 in the form of a video data stream, audio data stream, and a data stream of data. In step 1006, counter "j" is initialized to zero by the MXF File System Manager 376. In step 1008, the MXF File System Manager 376 hashes I, P, and B frames of GOP(j) and inserts into H-Frame(j) both blockchain digests and identifiers of the hash algorithm used (optionally encrypt GOPs for storage in MXF wrapper and store encryption key and blockchain hash digest in cloud and place an associated-link within H-Frame). The H-Frames may be stored within the generic container together as an H-Frame set. Alternatively, the H-Frames may be stored in the generic container contiguously with the Group of Pictures I, P, and B frames in the same sequence. In step 1008, the MXF File System Manager 376 also hashes audio blocks(j) and inserts into AH-Frame(j) both blockchain digests and identifiers of the hash algorithm used (optionally encrypt audio blocks for storage in MXF wrapper and store encryption key and blockchain hash digest in cloud and place an associated-link within AH-Frame). In step 1008, the MXF File System Manager 376 may also hash data blocks(j) and insert into DH-Frame(j) both blockchain digests and identifiers of hash algorithm used (optionally encrypt data blocks for storage in MXF wrapper and store encryption key and blockchain hash digest in cloud and place an associated-link within DH-Frame). Next in step 1010, the MXF File System Manager 376 melds frames and 1-byte MXF Flags to create H, I, P, B sequence of frames for the video stream. The MXF File System Manager 376 also melds blocks and 1-byte MXF Flags to create AH-frames and audio blocks for audio stream. The MXF File System Manager 376 further melds blocks and 1-byte MXF Flags to create DH frames and data blocks for data stream. Next in step 1012, the MXF File System Manager 376 inserts H, I, P, and B frames of the video stream and their respective keys into the MXF Wrapper 340. The MXF File System Manager 376 also inserts AH-frames and audio blocks of audio stream and their respective keys into the MXF Wrapper 340. The MXF File System Manager 376 further inserts DH-frames and data blocks of data stream and their respective keys into the MXF Wrapper 340. In step 1014, the MXF File System Manager 376 determines whether the end of the video, audio, and data streams has been reached. If the end of the streams for the video, audio and data has been reached, the entire media file 2 has been wrapped within MXF File 340 and the process ENDS in step 1016. If the end of any of the video, audio, and data streams has not been reached, then the process proceeds to step 1018 where the counter is incremented by 1 to j=j+1 and the process proceeds to step 1020 where the process returns to step 1008. This loop continues until the end of all of the video, audio, and data streams has been reached.

Figure 25:
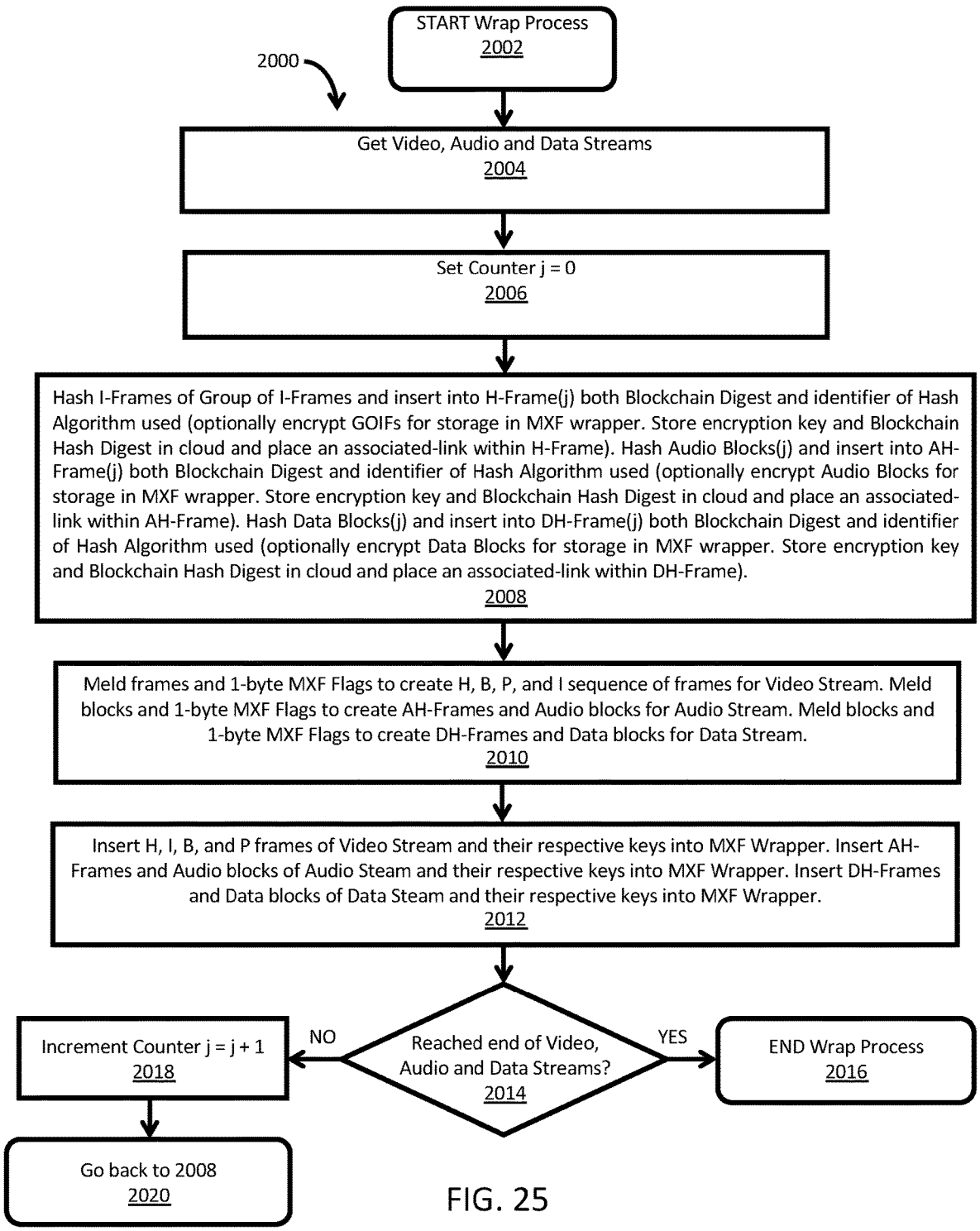
FIG. 25 depicts a flowchart 1000 illustrating a process for the wrapping of a media file including video, audio, and data into a Material eXchange Format (MXF) File where the Video Blockchain Hash Digest is based on a series of GOIFs.

FIG. 25 depicts a flowchart 2000 illustrating a process for the wrapping of a media file including video, audio, and data into a Material eXchange Format (MXF) File 340 where the video blockchain hash digest is based on a series of GOIFs. The process for wrapping a video media file 2, shown in FIG. 1, within a Material eXchange Format (MXF) File 340 begins with START 2002. This wrapping flowchart process 2000 is executed by an MXF File System Manager 376, depicted in FIG. 27. MXF File System Manager 376 is a series of software modules running on a hardware system as described in FIGS. 27-30. In step 2004, MXF File System Manager 376 acquires media file 2 in the form of a video data stream, audio data stream, and a data stream of data. In step 2006, counter "j" is initialized to zero by the MXF File System Manager 376. In step 2008, the MXF File System Manager 376 hashes I-Frames of a Group of I-Frames GOIF(j) and inserts into H-Frame(j) both blockchain digests and identifiers of the hash algorithm used (optionally encrypt GOIF(s) for storage in MXF wrapper and store encryption key and blockchain hash Digest in cloud and place an associated-link within H-Frame). In step 2008, the MXF File System Manager 376 also hashes audio blocks(j) and inserts into AH-Frame(j) both blockchain digests and identifiers of the hash algorithm used (optionally encrypt audio blocks for storage in MXF wrapper and store encryption key and blockchain hash digest in cloud and place an associated-link within AH-Frame). In step 2008, the MXF File System Manager 376 may also hash data blocks(j) and insert into DH-Frame(j) both blockchain digests and identifiers of hash algorithm used (optionally encrypt data blocks for storage in MXF wrapper and store encryption key and Blockchain Hash Digest in cloud and place an associated-link within DH-Frame). Next in step 2010, the MXF File System Manager 376 melds frames and 1-byte MXF Flags to create H, I, P, B sequence of frames for the video stream. The MXF File System Manager 376 also melds blocks and 1-byte MXF Flags to create AH-frames and audio blocks for audio stream. The MXF File System Manager 376 further melds blocks and 1-byte MXF Flags to create DH frames and data blocks for data stream. Next in step 2012, the MXF File System Manager 376 inserts H, I, P, and B frames of the video stream and their respective keys into the MXF Wrapper 340. The MXF File System Manager 376 also inserts AH-frames and audio blocks of audio stream and their respective keys into the MXF Wrapper 340. The MXF File System Manager 376 further inserts DH-frames and data blocks of data stream and their respective keys into the MXF Wrapper 340. In step 2014, the MXF File System Manager 376 determines whether the end of the video, audio, and data streams has been reached. If the end of the stream for the video, audio and data has been reached, the entire media file 2 has been wrapped within MXF File 340 and the process ENDS in step 2016. If the end of any of the video, audio, and data streams has not been reached, then the process proceeds to step 2018 where the counter is incremented by 1 to j=j+1 and the process proceeds to step 2020 where the process returns to step 2008. This loop continues until the end of all of the video, audio, and data streams has been reached. The link to the cloud-based hash digest may be accessible without any security credentials for a public access blockchain system. The link to the cloud-based hash digest may be accessible only with security credentials for a private access blockchain system.

Figure 26:
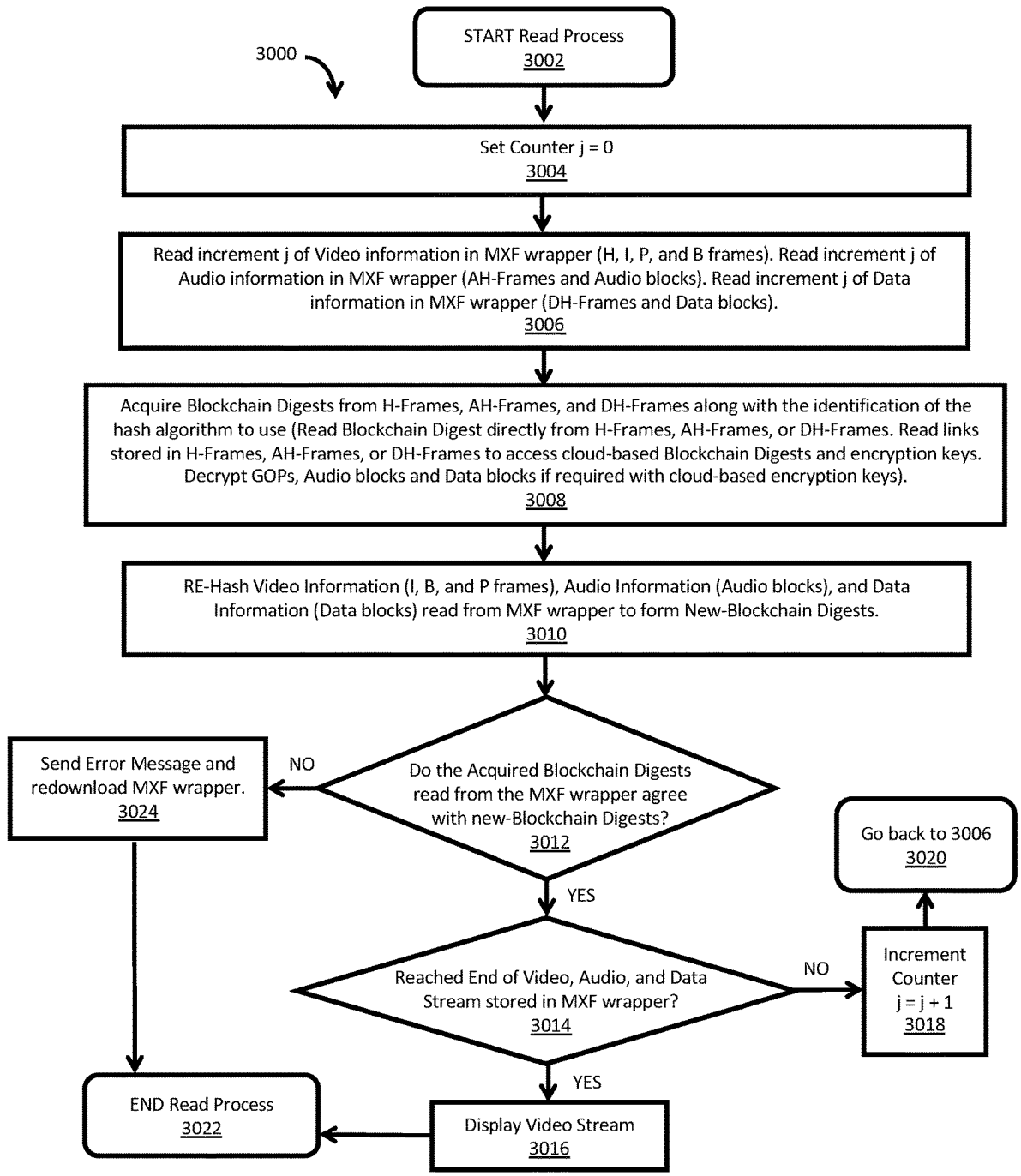
FIG. 26 depicts a flowchart illustrating a process for the unwrapping of a media file having video, audio, and data components from an MXF file.

FIG. 26 depicts a flowchart 3000 illustrating a process for the unwrapping of a media file having video, audio, and data from an MXF file. The process for unwrapping video media file 2, shown in FIG. 1, from a Material eXchange Format (MXF) File 340 begins with START 3002. This unwrapping flowchart process 3000 is executed by an MXF File System Manager 376, depicted in FIG. 27. MXF File System Manager 376 is a series of software modules running on a hardware system as described in FIGS. 27-30. In step 3004, counter j is set to 0, j=0. In step 3006, the MXF File System Manager 376 reads increment j of video information in MXF wrapper (H, I, P, and B frames) 340. In step 3006, the MXF File System Manager 376 also reads increment j of audio information in MXF wrapper 340 (AH-frames and audio blocks), as well as increment j of data information in MXF wrapper 340 (DH-frames and data blocks). In step 3008, the MXF File System Manager 376 acquires blockchain digests from H-Frames, AH-Frames, and DH-Frames along with the identification of the hash algorithm to use (read blockchain digest directly from H-Frames, AH-Frames, or DH-Frames; read links stored in H-Frames, AH-Frames, or DH-Frames to access cloud-based Blockchain Digests and encryption keys; and decrypt GOPs, audio blocks and data blocks if required with cloud-based encryption keys). In step 3010, the MXF File System Manager 376 re-hashes the video information (I, B, and P frames), audio information (audio blocks), and data information (data blocks) read from MXF wrapper 340 to form new-blockchain digests. Next in step 3012, the MXF File System Manager 376 determines if the acquired blockchain digests read from MXF wrapper 340 agree with the newly computed blockchain digest formulated from the data information read from the MXF wrapper 340. If the new blockchain hash digests do NOT match the blockchain hash digests acquired from the MXF wrapper 340, that shows that there is an error in the information contained within the MXF wrapper 340. Thus, the video file 2 in the MXF wrapper is corrupted and not suitable for use. As such, in step 3024, the MXF File System Manager 376 sends an error message to the sender node on the network that transmitted the MXF wrapper 340 to resend the MXF wrapper 340 to reattempt download and unwrapping according to flowchart 3000. The MXF File System Manager 376 may also send an error message to the administrator or user to inform them of the download error and need to redownload the file. The process then ENDS in step 3022. If the new blockchain digests match the blockchain digests acquired from the unwrapped MXF wrapper 340, the unwrapping process continues in step 3024 until the END of the video, audio, and data streams has been reached. If the END of the video, audio, and data streams have been reached, in step 3016 the video file 2 is available for usage by a user and the process then ENDS in step 3022. However, if the END of the video, audio, or data streams has not been reached, the process proceeds to step 3018 where the counter j is incremented by 1 to j=j+1, and the process proceeds to step 3006 in step 3020 until the END of the video, audio, and data streams has been reached. The code or instructions to execute processes 1000, 2000, and 3000 may be stored on a Hard Disk Drive (HDD); a Solid-State Drive (SSD); Electrically-Erasable, Programmable, Read-Only Memory (EEPROM); Write-Once, Read Mostly Memory (WORM); Random Access Memory (RAM); Compact Disk (CD); Digital Versatile Disk (DVD); Blu-Ray disc (BD); magnetic tape; a cloud; and the like.

Figure 27:
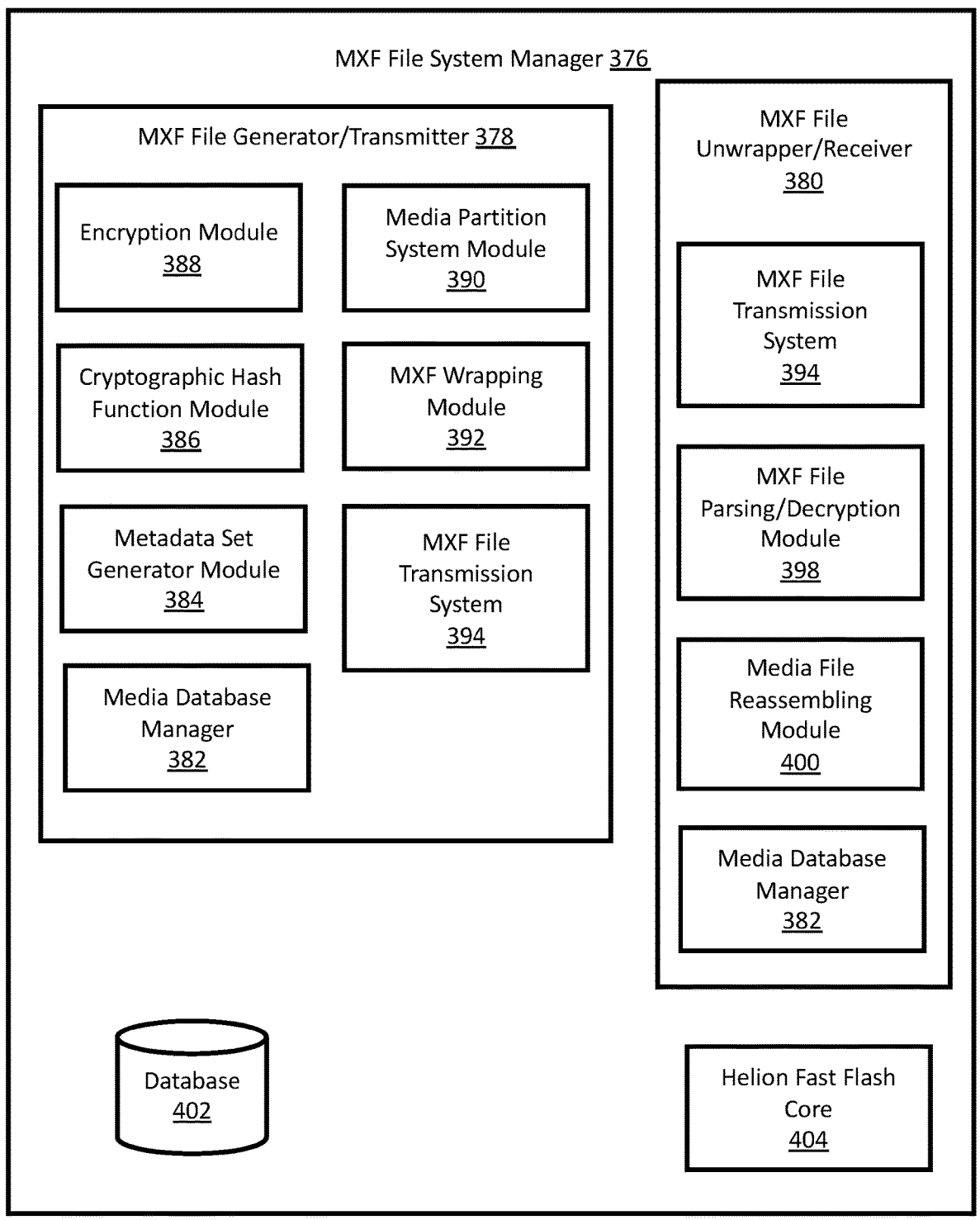
FIG. 27 depicts a software module diagram of an MXF File System Manager.

FIG. 27 depicts a software module diagram of an MXF File System Manager 376. System manager 376 includes a plurality of software modules along with a database storage device 402 such as a magnetic hard drive, magnetic tape, optical drive, solid-state storage device, cloud-based data storage, or other data storage medium. System manager 376 also includes a processor 404 to compute hash digests, such as the Helion Fast Hash Core ASIC (Application Specific Integrated Circuit) 404 discussed in FIG. 28. MXF file system manager 376 includes an MXF file generator/transmitter 378 that is configured to create an MXF file 340 as described in FIGS. 23 and 23 according to the process outlined in FIGS. 24 and 25. The MXF file generator/transmitter 378 stores a plurality of digital files on database storage device 402. These digital files may be media, such as music, movies, television shows, videos, photographs, or other media. These digital files may also be any sort of digital file such as software, database information, software code, executable instructions, or any other digital information. The digital files stored in database 402 are accessed and managed by media database manager 382. Media database manager 382 is a software program that stores, accesses, and manages all files on database device 402. Media database manager 382 may organize the digital files on database 402 according to a hierarchical database, a network database, a relational database, or an object-oriented database. The first step in generating an MXF file 340, as shown in FIG. 22, is to access the media file, or other digital file stored on database 402 with media database manager 382. Next, metadata set generator module 384 creates a set of metadata based on the media file. Metadata set generator module 382 creates system item 348, which includes metadata pack, package metadata set, picture metadata, sound metadata set, data metadata set, and control data set. After creating the metadata sets, MXF file generator/transmitter 378 utilizes cryptographic hash function module 386 to generate the H-Frames 16, 20, and 24, AH-Frames 28 and 32, and DH-Frames 36 and 40. Cryptographic hash function module 386 first generates the blockchain hash digests using, for example, a Helion Fast Hash Core 404 shown in FIG. 28, according to the process described in FIGS. 3, 7, 12, and 17. After creating these blockchain hash digests, cryptographic hash function module 386 assembles the different blockchain hash digests into H-Frames 16, 20, and 24, AH-Frames 28 and 32, and DH-Frames 36 and 40. Encryption module 388 may optionally encrypt each set of data, such as GOP1

Figure 29:
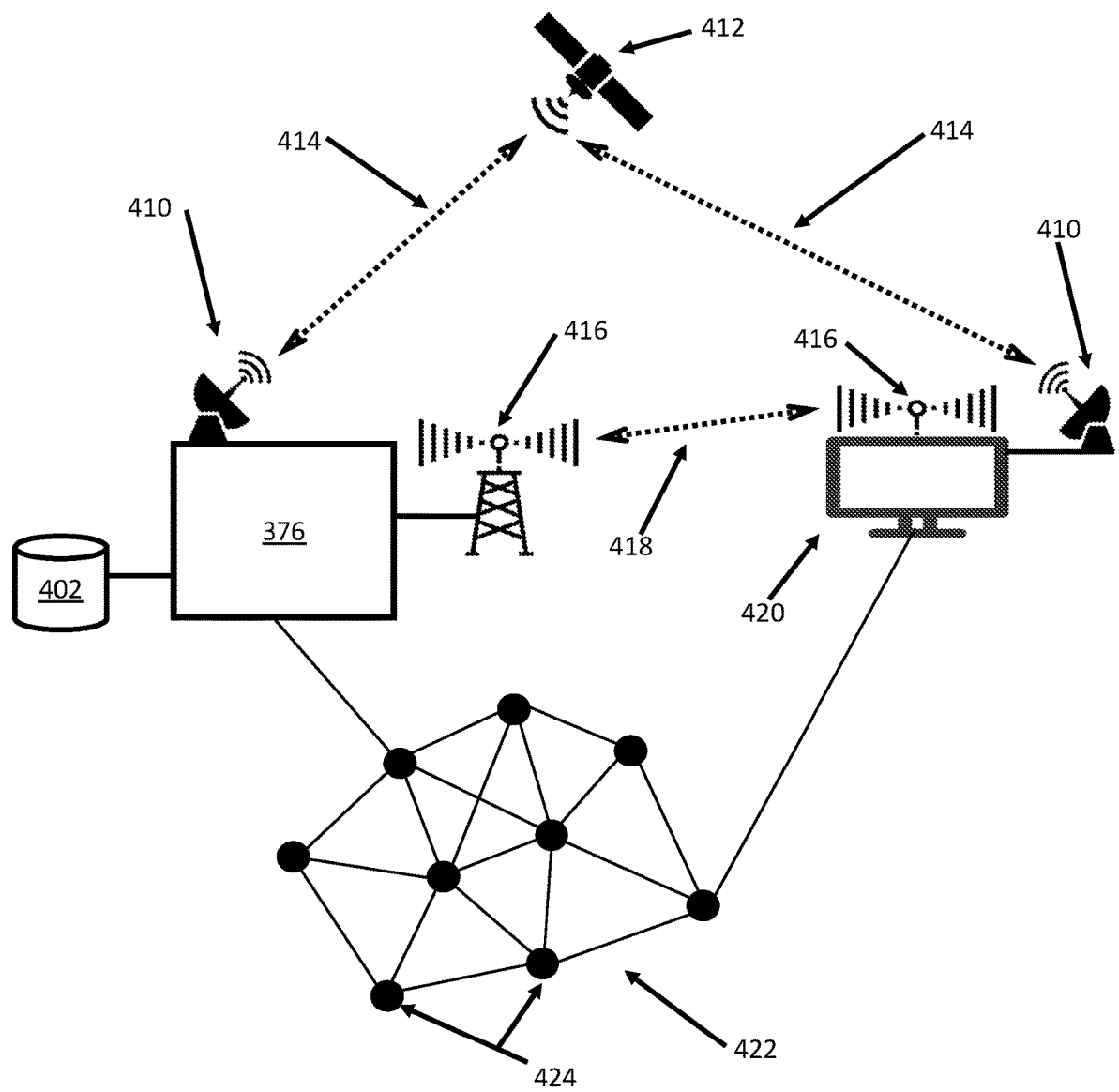
FIG. 29 illustrates an exemplary communications network for transmission of an electronic digital file and associated metadata via satellite communications links, wireless terrestrial communications links, and communications links provided by a distributed network.

18, GOP2 22, GOP3 26, AUDIO1 30, AUDIO2 34, DATA1 38, DATA2 42, and DATA3 46. Encryption module 388 may encrypt these data sets using keys that are stored in a remote cloud-based storage location. Links to these keys stored in the remote cloud-based storage location may then be placed by the encryption module 388 into the H-Frames, AH-Frames, and DH-Frames. Next, media partition system module 390 may optionally partition the picture and sound streams as needed and shown in FIG. 23. Then MXF wrapping module 392 places the digital files stored in database 402 and places them into generic containers as shown in FIGS. 22 and 23. Then, the MXF wrapping module 392 creates a Material eXchange Format (MXF) File by wrapping video file 2 into the Material eXchange Format (MXF) File 340. MXF file generator/transmitter 378 may then transmit the Material eXchange Format (MXF) File 340 from a sender node on a network to a receiver node on a network utilizing MXF file transmission system 394. The MXF file generator/transmitter 378 may transmit the Material eXchange Format (MXF) File across any form of digital transmission as shown in FIG. 29, such as satellite transmission, terrestrial wireless transmission, or transmission over optical or electrical cables through a network, such as a distributed network like the Internet. MXF file generator/transmitter 378 is located at all transmission nodes of a network that generate and send Material eXchange Format (MXF) Files 340, such a television stations, radio stations, distributed network-based media distribution outlets such as an Internet based media streaming service such as NETFLIX, iTUNES, or AMAZON PRIME VIDEO. MXF file system manager 376 also includes an MXF file parsing/decryption module 398 that allows for the decryption of the encrypted package, picture, sound, and data within the encrypted Material eXchange Format (MXF) File. MXF file parsing/decryption module 398 parses the encrypted package, picture, sound, and data from the Material eXchange Format (MXF) File for subsequent decryption.

MXF file system manager 376 may also include an MXF file unwrapper/receiver 380. MXF file unwrapper/receiver 380 is located at all receiver nodes that receive Material eXchange Format (MXF) Files, such as computer terminals, network television displays, or other network nodes that receive Material eXchange Format (MXF) Files. MXF file unwrapper/receiver 380 includes an MXF file transmission system 394 that is configured to receive Material eXchange Format (MXF) Files 340 across any digital communications link, such as a satellite communications link, terrestrial wireless communications link, or network communications link as shown in FIG. 29. Once MXF file unwrapper/receiver 380 receives a Material eXchange Format (MXF) File, MXF file parsing module 398 parses wrapped video and audio streams to isolate system item 348 as detailed in FIG. 22. From system item 348, MXF file unwrapper/receiver 380 isolates system metadata pack; package, picture, sound), and data metadata sets; and control data set. Next, media file reassembling module 400 takes all of the data, metadata, and media essence isolated from the Material eXchange Format (MXF) File by the MXF file unwrapper/receiver 380 and reassembles the original media file 2 for display on a computer terminal, television, movie display device, or other form of media display. MXF file unwrapper/receiver 380 may also include a media database manager 382 that can store media files wrapped from a Material eXchange Format (MXF) file 340. For example, database device 402 may be a DVR, local storage drive, or a cloud-based storage device.

Figure 28:
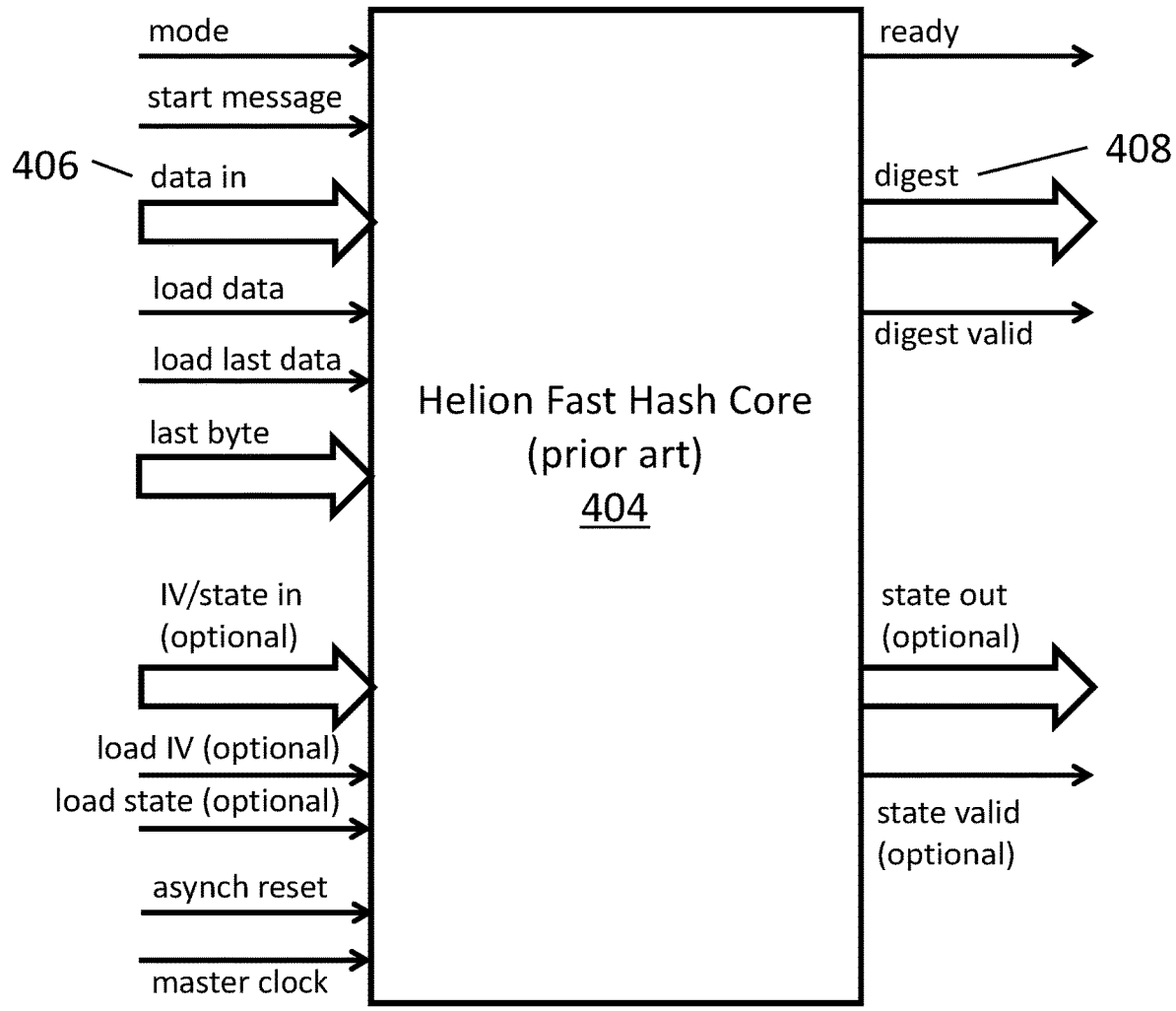
FIG. 28 illustrates a prior-art diagram of the Helion Fast Hash Core Application Specific Integrated Circuit (ASIC)

FIG. 28 illustrates a prior-art diagram of the Helion Fast Hash Core Application Specific Integrated Circuit (ASIC) 404 used in combination with MXF File System Manager 376. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data is fed into this ASIC at 406 and the resulting blockchain digest (sometimes called a message digest) output is 408. Such dedicated Hash Core ASICs have faster performance than software running in a cloud or computer memory under an operating system. Hash input 406 would be, for example, Group Of Pictures in Stored Order or Group Of I-Frames. It is blockchain digest 408 that is stored in H-Frames, AH-Frames, or DH-Frames.

FIG. 29 illustrates an exemplary communications network for transmission of an electronic digital file and associated metadata via satellite communications links 414, wireless terrestrial communications links 418, and communications links provided by a distributed network 422. An MXF file system manager 376 is shown residing on a sender node of a distributed network 422. The sender node may be a television station, network-based video streaming service, cable service provider, radio station, network-based radio streaming service, or any other form of digital media service provider. MXF file system manager 376 is coupled to a database storage device 402 that may be local or cloud-based. The sender node supporting MXF file system manager 376 is coupled to a satellite transmission system 410 that may transmit signals bidirectionally across communications link 414 through a satellite 412 to a receiver node 420 that is depicted as having a conventional display device, such as a computer terminal, mobile electronic device, television, movie display, or other media display device. Receiver node 420 includes a satellite transmission system 410 that is capable of bidirectional communication with satellite 412 in order to receive the Material eXchange Format (MXF) File from the sender node 376. Sender node 376 is also coupled to a terrestrial wireless transmission antenna 416 that sends communications bidirectionally across a communications link 418 with a terrestrial wireless transmission antenna 416 located at receiver node 420 enabling the bidirectional transmission of Material eXchange Format (MXF) Files between sender node 376 and receiver node 420. Sender node 376 and receiver node 420 are also both coupled to a distributed network 422, such as the Internet, allowing for the bidirectional transmission of Material eXchange Format (MXF) Files between sender node 376 and receiver node 420.

Figure 30:
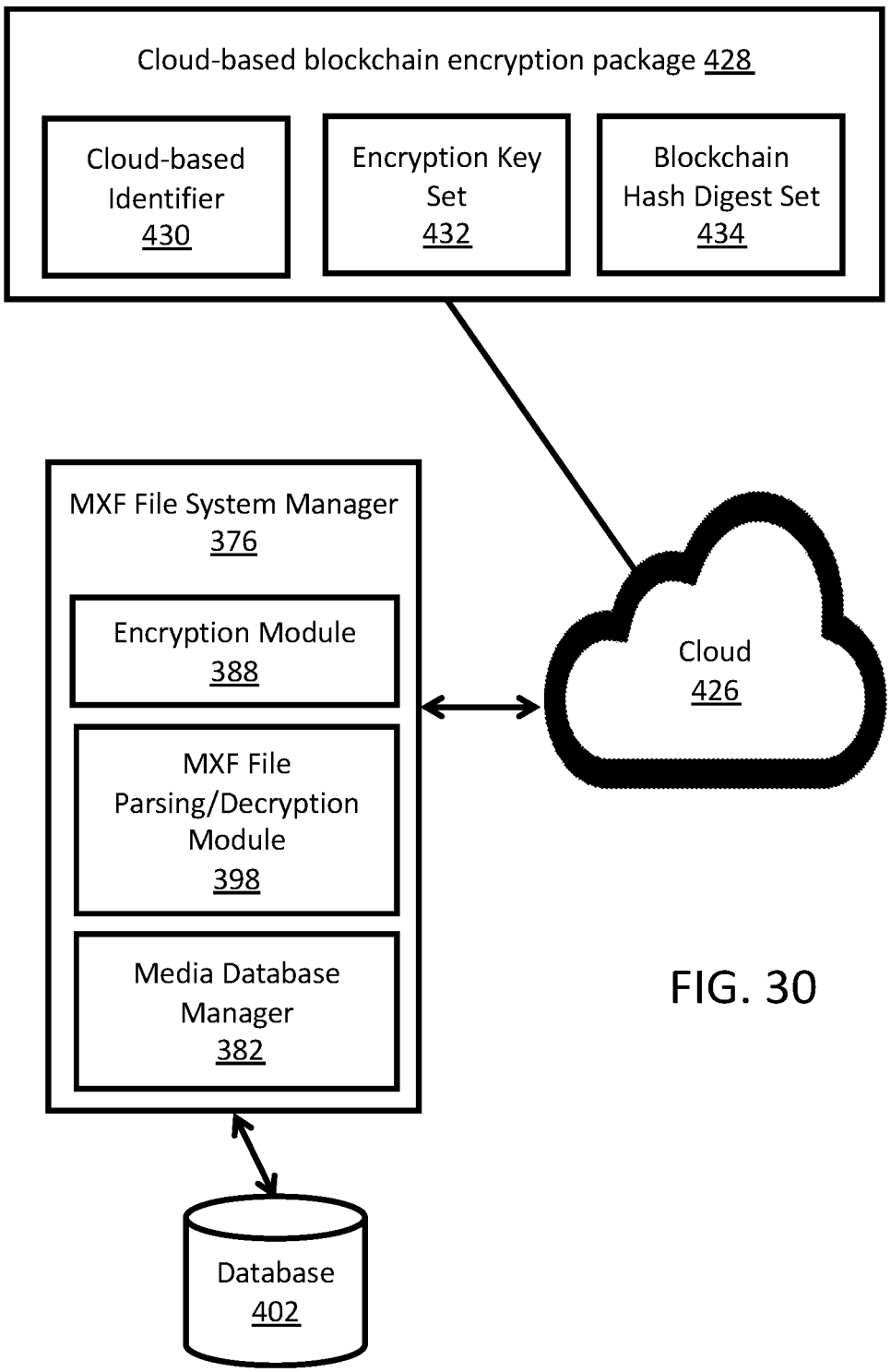
FIG. 30 depicts a block diagram of an MXF file system manager accessing a cloud-based storage location storing a cloud-based blockchain encryption package.

FIG. 30 depicts a block diagram of an MXF file system manager 376 accessing a cloud-based storage location 426 storing a cloud-based blockchain encryption package 428. MXF file system manager 376 includes an encryption module 388 that encrypts the package, picture, sound, and data. Encryption module 388 may use a variety of forms of encryption to encrypt the video, sound, and data of the Material eXchange Format (MXF) File. These forms of encryption can include the use of public keys or private keys. Non-limiting examples of well-regarded asymmetric key techniques include: Diffie-Hellman key exchange protocol; DSS (Digital Signature Standard), which incorporates the Digital Signature Algorithm; ElGamal; Various elliptic curve techniques; Various password-authenticated key agreement techniques; Paillier cryptosystem; RSA encryption algorithm (PKCS#1); Cramer-Shoup cryptosystem; and YAK authenticated key agreement protocol. Encryption module 388 may access stored public or private keys from database 402 and use them to encrypt the video, sound, and data of the Material eXchange Format (MXF) File. Encryption module 388 may encrypt the video, sound, and data separately with different encryption keys. Encryption module 388 may then bundle all of these different encryption keys for the video, sound, and data into an encryption key set 432. Alternatively, encryption module 388 may use a single encryption key to encrypt the media of the Material eXchange Format (MXF) File. MXF file system manager 376 wraps the encryption key set 432 together with the blockchain hash digest set 434 and the cloud-based identifier 430 into cloud-based blockchain encryption package 428. Blockchain hash digest set 74 is formed of the hash digests created for the H-Frames, AH-Frames, and DH-Frames. Cloud-based identifier 430 allows the MXF file system manager 376 to correctly identify and access the cloud-based blockchain encryption package 428 in cloud 426 using the links stored in the H-Frame, AH-Frame, and DH-Frame. MXF file system manager 376 also includes an MXF file parsing/decryption module 398 that allows for the decryption of the encrypted video, sound, and data within the encrypted Material eXchange Format (MXF) File. MXF file parsing/decryption module 388 parses the encrypted package, picture, sound, and data from the Material eXchange Format (MXF) File for subsequent decryption.

While the invention has been shown and described with reference to a particular embodiment thereof, it will be understood to those skilled in the art, that various changes in form and details may be made therein without departing from the spirit and scope of the invention. For example, visual nouns such as picture and video may be generally considered synonymous.

The invention claimed is:

1. A media blockchain system manager that stores blockchain information on a Group of Pictures file within a Blockchain Augmented Group of Pictures file, comprising:
a digital storage device that stores a Blockchain Augmented Group of Pictures File that has a file format of a Group of Pictures File having frames that is formed of I, B, P, and H-frames, wherein the H-frame stores blockchain hash digest information based upon the I, B, or P-frames, wherein the Blockchain Augmented Group of Pictures File is formed by:
blockchaining a Group of Pictures File formed of I, B, and P-frames to create blockchain hash digest information that is stored within the H-frame; and
generating a new Blockchain Augmented Group of Pictures File that includes a new H-frame in addition to the I, B, and P-frames from the Group of Pictures File in order to store the blockchain hash digest information within the Blockchain Augmented Group of Pictures File, wherein a video stream of the Blockchain Augmented Group of Pictures File includes streaming of I, B, P, and H-frames so that the video stream includes blockchain hash digest information through the H-frame.

2. The media blockchain system manager of claim 1, wherein the blockchain hash digest information is generated from just the I-frames extracted from Group of Pictures File, wherein the B and P frames of the Group of Pictures File are not used for generating the blockchain hash digest information because the I-frames are independently coded from the B and P-frames.

3. The media blockchain system manager of claim 1, wherein the blockchain hash digest information is a link to a cloud-based blockchain hash digest.

4. The media blockchain system manager of claim 3, wherein the Blockchain Augmented Group of Pictures File is encrypted with a cloud-based encryption key and stores that cloud-based encryption key within the H-frame.

5. The media blockchain system manager of claim 1, wherein an identifier specifying the hash algorithm used to form the blockchain hash digest information is stored in the H-frame.

6. The media blockchain system manager of claim 5, wherein the Blockchain Augmented Group of Pictures File is transmitted across a communications link from a sender node to a receiver node selected from the group consisting of a satellite transmission link, a terrestrial wireless transmission link, and a distributed network communications link, wherein display of the Blockchain Augmented Group of Pictures File is allowed when newly generated blockchain hash digest information based on the transmitted I, B, and P-frames matches the blockchain hash digest information transmitted within the H-frame, wherein display of the Blockchain Augmented Group of Pictures File is denied when newly generated blockchain hash digest information based on the transmitted I, B, and P-frames does not match the blockchain hash digest information transmitted within the H-frame.

7. The media blockchain system manager of claim 1, wherein the H-frames may be stored together as an H-Frame set separate from the I, B, and P-frames, or the H-frames may be stored contiguously with the I, B, and P-frames in the same sequence.

8. The media blockchain system manager of claim 1, wherein the blockchain system manager generates a video stream for transmission that comprises a sequence of frames formed of H, I, P, and B-Frames from the Blockchain Augmented Group of Pictures File.

9. A non-transitory computer tangible medium containing instructions for executing a blockchain verification process for a Group of Pictures, comprising:
accessing a stored a Blockchain Augmented Group of Pictures File having I, B, P and H-Frames, wherein the H-Frame contains blockchain hash digest information based on a portion of the I, B, P-Frames, wherein the Blockchain Augmented Group of Pictures File has a file format of a Group of Pictures File having information stored in frames;
separating the blockchain hash digest information contained in the H-Frame of the Blockchain Augmented Group of Pictures File from the I, B, and P-Frames also contained within the Blockchain Augmented Group of Pictures File;
forming a new blockchain hash digest based on the same types of I, B, and P-Frames used to generate the blockchain hash digest information stored in the H-Frame; and
comparing the new blockchain hash digest to the blockchain hash digest information contained within the H-Frame, wherein display of the I, B, and P-Frames from the Blockchain Augmented Group of Pictures File is allowed when the new blockchain hash digest matches the blockchain hash digest information contained within the H-Frame.

10. The non-transitory computer tangible medium of claim 9, further comprising denying the display of the Blockchain Augmented Group of Pictures File when the new blockchain hash digest information does not match the blockchain hash digest contained within the H-Frame.

11. The non-transitory computer tangible medium of claim 10, further comprising retransmitting the Blockchain Augmented Group of Pictures File when the new blockchain hash digest does not match the blockchain hash digest information contained within the H-Frame.

12. The non-transitory computer tangible medium of claim 11, wherein the Blockchain Augmented Group of Pictures File is retransmitted across a communications link from a sender node to a receiver node selected from the group consisting of a satellite transmission link, a terrestrial wireless transmission link, and a distributed network communications link.

13. The non-transitory computer tangible medium of claim 12, wherein the blockchain hash digest information is a blockchain hash digest.

14. The non-transitory computer tangible medium of claim 12, wherein the blockchain hash digest information is a link to a cloud-based blockchain hash digest.

15. The non-transitory computer tangible medium of claim 9, wherein the H-Frames may be stored together as an H-Frame set separate from the I, B, and P-Frames, or the H-Frames may be stored contiguously with the I, B, and P-Frames in the same sequence.

16. The non-transitory computer tangible medium of claim 9, further comprising generating a video stream for transmission from the Blockchain Augmented Group of Pictures File that comprises a sequence of frames formed of H, I, P, and B-Frames.

17. The non-transitory computer tangible medium of claim 9, further comprising:
   accessing a Group of Pictures video stream having I, B, and P-Frames;
   extracting the I-Frames from the video stream; and
   generating the blockchain hash digest information based upon the I-Frames only.

18. A non-transitory computer tangible medium containing instructions for creating a Blockchain Augmented Group of Pictures File, comprising:
   accessing a Group Of Pictures (GOP) file formed of I, B, and P-frames stored in electronic data storage;
   blockchaining the I-Frames to form blockchain information;
   creating a new Blockchain Augmented Group of Pictures File that incorporates the blockchain information and the Group of Pictures file within it, wherein the new Blockchain Augmented Group of Pictures File has the format of a Group of Pictures file having frames, wherein the new Blockchain Augmented Group of Pictures File includes I, B, P, and H-frames, wherein the I, B, and P-frames are from the Group of Pictures (GOP) file, wherein the H-frames are frames that store blockchain information.

19. The non-transitory computer tangible medium containing instructions for creating a Blockchain Augmented Group of Pictures File of claim 18, wherein the blockchain information is formed from blockchaining the I, B, and P-frames of the Group of Pictures (GOP) file.

20. The non-transitory computer tangible medium containing instructions for creating a Blockchain Augmented Group of Pictures File of claim 19, wherein storing the blockchain information within the new Blockchain Augmented Group of Pictures Files causes the blockchain information stored within the H-frame to be streamed along with the I, B, and P-frames from the Blockchain Augmented Group of Pictures File when forming a video stream based on the new Blockchain Augmented Group of Pictures File.

\* \* \* \* \*